(12) United States Patent
Ota et al.

(10) Patent No.: US 12,091,526 B2
(45) Date of Patent: Sep. 17, 2024

(54) MODEL MATERIAL CLEAR COMPOSITION AND COMPOSITION SET FOR OPTICAL SHAPING

(71) Applicant: Maxell, Ltd., Kyoto (JP)

(72) Inventors: Hiroshi Ota, Kyoto (JP); Hiroki Sakata, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/895,607

(22) Filed: Aug. 25, 2022

(65) Prior Publication Data

US 2023/0100703 A1 Mar. 30, 2023

(30) Foreign Application Priority Data

Sep. 10, 2021 (JP) ................... 2021-148105

(51) Int. Cl.

| | |
|---|---|
| C08F 2/46 | (2006.01) |
| B33Y 70/00 | (2020.01) |
| C08F 2/50 | (2006.01) |
| C08G 61/04 | (2006.01) |
| C08K 5/00 | (2006.01) |
| C08K 5/13 | (2006.01) |

(52) U.S. Cl.
CPC ............ *C08K 5/13* (2013.01); *B33Y 70/00* (2014.12); *C08K 5/0041* (2013.01)

(58) Field of Classification Search
CPC ........ C08K 5/13; C08K 5/0041; C08K 5/005; B33Y 70/00; B33Y 10/00; B29C 64/112; C08L 33/14
USPC ................. 522/64, 6, 189, 184, 71, 1; 520/1
See application file for complete search history.

(56) References Cited

U.S. PATENT DOCUMENTS

| | | |
|---|---|---|
| 2019/0009453 A1 | 1/2019 | Kitou et al. |
| 2020/0023572 A1 | 1/2020 | Kito et al. |
| 2020/0115578 A1 | 4/2020 | Wang |

FOREIGN PATENT DOCUMENTS

| | | | |
|---|---|---|---|
| JP | 2017-31249 A | 2/2017 | |
| JP | 2020-528018 A | 9/2020 | |
| WO | WO-2017099139 A1 * | 6/2017 | ................ C08F 2/44 |
| WO | WO-2018164012 A1 * | 9/2018 | ........... B29C 64/112 |
| WO | 2021/182509 A1 | 9/2021 | |

OTHER PUBLICATIONS

Sanai et al, WO 2017099139 Machine Translation, Jun. 15, 2017 (Year: 2017).*
Kito et al, WO 2018164012 Machine Translation, Sep. 13, 2018 (Year: 2018).*

* cited by examiner

*Primary Examiner* — Jessica Whiteley
(74) *Attorney, Agent, or Firm* — Rimon P.C.

(57) ABSTRACT

A model material clear composition comprises an ethylenically unsaturated monomer (A1) having at least one selected from the group consisting of a dicyclopentenyl group and a dicyclopentanyl group, at least one photopolymerization initiator selected from the group consisting of an acylphosphine oxide-based photopolymerization initiator and an α-hydroxyacetophenone-based photopolymerization initiator, a hindered amine-based polymerization inhibitor, and a phenolic antioxidant, and contents (% by mass) of the initiator, the polymerization inhibitor, and the antioxidant satisfy Formula (1): content of photopolymerization initiator≥content of polymerization inhibitor≥content of oxidation inhibitor, and Formula (2): $1 \leq \sqrt{\text{content of photopolymerization initiator}}/\sqrt{[(\text{content of polymerization inhibitor} \times 10)^2 + (\text{content of antioxidant} \times 100)^2]} \leq 800$.

18 Claims, No Drawings

MODEL MATERIAL CLEAR COMPOSITION AND COMPOSITION SET FOR OPTICAL SHAPING

CROSS-REFERENCE TO RELATED APPLICATION

This application claims benefit under Article 4 of the Paris Convention based on Japanese Patent Application No. 2021-148105 filed in Japan on Sep. 10, 2021, incorporated herein by reference in its entirely.

BACKGROUND OF THE INVENTION

(1) Field of the Invention

The present invention relates to a model material clear composition to be used for shaping a model material by a material-jet optical shaping process, and a composition set for material-jet optical shaping comprising the model material clear composition.

(2) Description of Related Art

Conventionally, there has been widely known three-dimensional optical shaping for fabricating a three-dimensionally shaped article by continuously forming a cured layer having a prescribed shape by irradiating a photocurable resin composition with ultraviolet rays. Especially, as a shaping method by which a three-dimensional shaped article can be freely fabricated with a 3D printer, wide attention has been attracted on a optical shaping process by a material-jet system (an inkjet system) (the process is hereinafter also referred to as a "material-jet optical shaping process"), in which a photocurable resin composition is jetted through a nozzle and, immediately after that, light such as an ultraviolet ray is irradiated to cure the resin composition, and thereby a cured layer having a prescribed shape is laminated to fabricate a three-dimensionally shaped article.

The model material clear composition for use in a material-jet optical shaping process is required to have performance specific to the application thereof. Examples of the required performance include that even after a long-term preservation, the composition exhibits a small viscosity change and affords, with a high dimensional accuracy, a cured product having a high transparency (transmissibility) and low yellowness.

Patent Document 1 describes a resin composition for a model material, the composition being to be used for shaping a model material by an inkjet optical shaping process and comprising a water-insoluble monofunctional ethylenically unsaturated monomer (A), a di- or more functional polyfunctional ethylenically unsaturated monomer (B), an oligomer (C), a photopolymerization initiator (D), and a surface adjusting agent (E) in specific amounts respectively. This resin composition for a model material may contain an antioxidant as a preservation stabilizer (F), thereby making it possible to prevent head clogging caused by polymerization of the polymerizable compound by thermal energy.

The resin composition for a model material in Patent Document 1 exhibits a small shrinkage rate when cured, and affords a shaped article with a good dimensional accuracy by inkjet optical shaping. However, Patent Document 1 does not describe improving preservation stability of an ink and transparency or color tone of a shaped article.

Patent Document 2 describes a photocurable transparent ink composition for three-dimensional shaping comprising a specific amount of a yellowing adjusting agent that absorbs light in a wavelength range of 560 nm to 650 nm. In the transparent ink composition disclosed in Patent Document 2, the yellowing adjusting agent reflects complementary color light of yellow light to avoid yellowing of a cured product by utilizing a complementary color principle of light. The complementary color principle of light is based on the premise that a base material has yellowness, and the yellowing adjusting agent adds a complementary color to cancel the yellowness of the base material.

However, Patent Document 2 does not disclose a solution to yellowing that occurs when a polymerizable component such as a monomer of a transparent ink composition is photocured. Therefore, the transparent ink composition in Patent Document 2 has a problem that when yellowness of a cured product becomes strong due to a change of a polymerizable component, a color tone becomes dark due to a yellowing adjusting agent.

Patent Document 3 describes a model material ink set comprising a clear ink in which the content of a nitrogen atom-containing ethylenically unsaturated monomer contained as a polymerizable compound is reduced. The model material ink set in Patent Document 3 can sufficiently enhance strength of a shaped article as a photocured product of a color ink and a clear ink and can prevent color change of the shaped article.

PRIOR ART DOCUMENTS

Patent Documents

Patent Document 1: Japanese Patent Laid-open Publication No. 2017-31249
Patent Document 2: Japanese Unexamined Patent Application Publication No. 2020-528018
Patent Document 3: WO 2018/164012

SUMMARY OF THE INVENTION

In recent years, a three-dimensionally shaped article obtained by a material-jet optical shaping process tends to be required to have higher appearance characteristics, and a model material having a highly transparent and a crystal-like color tone with further reduced yellowness is required. Here, the crystal-like tone refers to a color tone like crystal glass, and the crystal glass is high-quality colorless transparent glass.

The present invention solves the conventional problems described above and an object thereof is to provide a model material clear composition for material-jet optical shaping that is superior in preservation stability, is suppressed in occurrence of yellowing due to photocuring of a polymerizable component, and can afford a model material that is highly transparent and exhibits a crystal-like color tone.

The present invention provides the following preferred embodiments.

[1] A model material clear composition for use in a material-jet optical shaping process, the model material clear composition comprising an ethylenically unsaturated compound (A), a photopolymerization initiator, a polymerization inhibitor, and an antioxidant, wherein
  the ethylenically unsaturated compound (A) comprises an ethylenically unsaturated monomer (A1) having at least one group selected from a group consisting of a dicyclopentenyl group and a dicyclopentanyl group,
  the photopolymerization initiator is at least one photopolymerization initiator selected from a group consisting of an acylphosphine oxide-based photopolymerization initiator and an α-hydroxyacetophenone-based photopolymerization initiator, the polymerization inhibitor is a hindered amine-based polymerization inhibitor, the antioxidant is a phenolic antioxidant, and contents (% by mass) of the initiator, the polymerization inhibitor, and the antioxidant satisfy the following Formulae (1) and (2):

content of photopolymerization initiator≥content of polymerization inhibitor≥content of oxidation inhibitor    (1)

$1 \leq \sqrt{\text{content of photopolymerization initiator}/\sqrt{[(\text{content of polymerization inhibitor} \times 10))^2 + (\text{content of antioxidant} \times 100)^2]}} \leq 800$    (2).

[2] The model material clear composition according to [1], wherein the ethylenically unsaturated monomer (A1) is contained in an amount of 30% by mass or more based on the total mass of the ethylenically unsaturated compound (A).

[3] The model material clear composition according to [1] or [2], wherein the ethylenically unsaturated compound (A) further comprises an ethylenically unsaturated compound (A2) having an aliphatic cyclic structure in a molecule and having a urethane group.

[4] The model material clear composition according to [3], wherein the ethylenically unsaturated compound (A2) is contained in an amount of 10% by mass or more based on the total mass of the ethylenically unsaturated compound (A).

[5] The model material clear composition according to any one of [1] to [4], wherein the ethylenically unsaturated compound (A) further comprises an ethylenically unsaturated monomer (A3), the ethylenically unsaturated monomer (A1) and the ethylenically unsaturated compound (A2) being excluded from (A3).

[6] The model material clear composition according to any one of [1] to [5], wherein the photopolymerization initiator is at least one photopolymerization initiator selected from a group consisting of 2,4,6-trimethylbenzoyl-diphenyl-phosphine oxide, bis(2,4,6-trimethylbenzoyl)-phenyl-phosphine oxide, and 1-hydroxy-cyclohexyl-phenyl-ketone.

[7] The model material clear composition according to any one of [1] to [6], wherein the content of the photopolymerization initiator is from 0.5 to 15% by mass.

[8] The model material clear composition according to any one of [1] to [7], wherein the content of the polymerization inhibitor is from 0.01 to 5% by mass.

[9] The model material clear composition according to any one of [1] to [8], wherein the content of the antioxidant is from 0.001 to 3% by mass.

[10] The model material clear composition according to any one of [1] to [9], further comprising a surface adjusting agent.

[11] The model material clear composition according to any one of [1] to [10], further comprising a color material having an absorption wavelength of 530 to 620 nm.

[12] The model material clear composition according to any one of [1] to [11], wherein a viscosity change rate of the model material clear composition stored for 30 days under an environment of 60° C. to the model material clear composition before storage is less than 10%.

[13] The model material clear composition according to any one of [1] to [12], wherein the model material clear composition provides a photocured product having an L* value of 90 or more, an a* value of −2 or more and less than 2, and a b* value of −10 or more and less than 4 in an Lab color system at a thickness of 2 mm.

[14] A photocured product obtained by photocuring the model material clear composition according to any one of [1] to [13].

[15] A composition set for material-jet optical shaping, comprising the model material clear composition according to any one of [1] to and a model material color composition for use in a material-jet optical shaping process.

[16] A composition set for material-jet optical shaping, comprising the model material clear composition according to any one of [1] to and a support material composition for shaping a support material by a material-jet optical shaping process.

[17] The composition set for material-jet optical shaping according to [16], further comprising a model material color composition for use in a material-jet optical shaping process.

[18] An optically shaped article obtained by photocuring the model material clear composition according to any one of [1] to or the composition set for material-jet optical shaping according to any one of to [17] by a material-jet optical shaping process.

According to the present invention, there is provided a model material clear composition for material-jet optical shaping that is superior in preservation stability, is suppressed in occurrence of yellowing due to photocuring of a polymerizable component, and can afford a model material that is highly transparent and exhibits a crystal-like color tone.

DETAILED DESCRIPTION OF PREFERRED EMBODIMENTS

Hereinafter, embodiments of the present invention will be described in detail. The scope of the present invention is not limited to the embodiments described herein, and various modifications can be made within a scope not impairing the spirit of the present invention.

[Ethylenically Unsaturated Compound (A)]

A model material clear composition of the present invention comprises an ethylenically unsaturated compound (A). The ethylenically unsaturated compound (A) is a polymerizable compound having at least one ethylenic double bond in a molecule and having a property of being cured with energy rays. The ethylenically unsaturated compound (A) may be any of a polymerizable monomer, a polymerizable oligomer, and a polymerizable polymer. The ethylenically unsaturated compound may be either a monofunctional ethylenically unsaturated compound having one ethylenic double bond in the molecule or a polyfunctional ethylenically unsaturated compound having two or more ethylenic double bonds in the molecule.

<Ethylenically Unsaturated Monomer (A1)>

The model material clear composition of the present invention comprises, as the ethylenically unsaturated compound (A), an ethylenically unsaturated monomer (A1) having at least one group selected from a group consisting of a dicyclopentenyl group and a dicyclopentanyl group (hereinafter, also simply referred to as "ethylenically unsaturated monomer (A1)"). Although the reason is not clear, a cured product obtained from the ethylenically unsaturated monomer (A1) having at least one group selected from the group consisting of a dicyclopentenyl group and a dicyclopentanyl group tends to be less likely to be yellowed by light, such as ultraviolet rays, applied during curing. Therefore, when the model material composition comprises the ethylenically unsaturated monomer (A1) as a polymerizable compound, color change (particularly yellowing) at the time of curing the model material composition by irradiation with light hardly occurs, so that a model material (an optically shaped article) having a suppressed yellowness and a superior transparency can be obtained.

The ethylenically unsaturated monomer (A1) is not particularly limited as long as it is a polymerizable monomer having at least one group selected from the group consisting of a dicyclopentenyl group and a dicyclopentanyl group and having at least one ethylenic double bond in the molecule, and may be a monofunctional monomer or a polyfunctional monomer. Examples of the ethylenically unsaturated monomer (A1) include (meth)acrylates having at least one group selected from the group consisting of a dicyclopentenyl group and a dicyclopentanyl group, and specific examples thereof include dicyclopentenyl acrylate, dicyclopentenyl methacrylate, dicyclopentenyloxyethyl acrylate, dicyclopentenyloxyethyl methacrylate, dicyclopentanyl acrylate, dicyclopentanyl methacrylate, ethoxylated dicyclopentenyl acrylate, ethoxylated dicyclopentenyl methacrylate, alkoxylated dicyclopentenyl acrylates, alkoxylated dicyclopentenyl methacrylates, dicyclopentanyloxyethyl acrylate, dicyclopentanyloxyethyl methacrylate, ethoxylated dicyclopentanyl acrylate, ethoxylated dicyclopentanyl methacrylate, alkoxylated dicyclopentanyl acrylates and alkoxylated dicyclopentanyl methacrylates. Among them, (meth)acrylates having at least one group selected from the group consisting of a dicyclopentenyl group and a dicyclopentanyl group are preferable, dicyclopentenyl acrylate, dicyclopentenyloxyethyl acrylate, dicyclopentenyl methacrylate, dicyclopentenyloxyethyl methacrylate, dicyclopentanyl acrylate, and dicyclopentanyloxyethyl acrylate are more preferable, dicyclopentenyl acrylate, dicyclopentenyloxyethyl acrylate, dicyclopentenyloxyethyl methacrylate, and dicyclopentanyl acrylate are even more preferable, and dicyclopentenyloxyethyl acrylate is particularly preferable. These ethylenically unsaturated monomers (A1) may be used singly or two or more thereof may be used in combination.

In the present description, the "(meth)acrylate" represents both or any one of acrylate and methacrylate, and the same applies "(meth)acrylamide".

The content of the ethylenically unsaturated monomer (A1) in the model material clear composition of the present invention is preferably 30% by mass or more, more preferably 35% by mass or more, even more preferably 41% by mass or more, particularly preferably 45% by mass or more, and especially preferably 50% by mass or more based on the total mass of the ethylenically unsaturated compound (A). When the content of the ethylenically unsaturated monomer (A1) based on the total mass of the ethylenically unsaturated compound (A) is equal to or more than the above lower limit, the model material clear composition is superior in the effect of suppressing yellowing during photocuring, and in a resulting model material, yellowness is little and a high transparency can be achieved. Therefore, from the viewpoint of becoming easy to improve the transparency of a resulting model material, it is more preferable that the content of the ethylenically unsaturated monomer (A1) is larger. On the other hand, for example, in a model material obtained by adjusting the contents in a relationship with the ethylenically unsaturated compound (A2) and the ethylenically unsaturated monomer (A3) to be described later, it becomes easy to control the mechanical characteristics such as strength while suppressing yellowness and securing a high transparency. Therefore, the content of the ethylenically unsaturated monomer (A1) is preferably 85% by mass or less, more preferably 80% by mass or less, even more preferably 75% by mass or less, particularly preferably 70% by mass or less, especially preferably 69% by mass or less, and still especially preferably 65% by mass or less based on the total mass of the ethylenically unsaturated compound (A).

<Ethylenically Unsaturated Monomer (A2)>

The model material clear composition of the present invention preferably comprises, as the ethylenically unsaturated compound (A), an ethylenically unsaturated compound (A2) having an aliphatic cyclic structure in the molecule and having a urethane group (hereinafter, also simply referred to as "ethylenically unsaturated compound (A2)"). When the model material clear composition contains the ethylenically unsaturated compound (A2), a desired strength tends to be imparted to a resulting model material.

The ethylenically unsaturated compound (A2) is not particularly limited as long as it is a polymerizable compound having an aliphatic cyclic structure in the molecule and having at least one urethane group and at least one ethylenic double bond, and may be any of a monomer, an oligomer, and a polymer. In the present description, the aliphatic cyclic structure means a structure in which carbon atoms are cyclically bonded wherein a saturated or unsaturated carbocyclic ring having no aromaticity is contained, and examples thereof include a cycloalkane skeleton, a cycloalkene skeleton, an adamantane skeleton, a norbornane skeleton, an isophorone skeleton, and a tricyclodecane skeleton.

Examples of the ethylenically unsaturated compound (A2) include a urethane (meth)acrylate having an aliphatic cyclic structure as described as an example above, and a urethane (meth)acrylate oligomer having an aliphatic cyclic structure. Specific examples thereof include a urethane (meth)acrylate oligomer having a dicyclohexylmethane structure, a urethane (meth)acrylate oligomer having an isophorone structure, and a urethane (meth)acrylate oligomer having a cyclohexylmethane structure. Among them, a urethane (meth)acrylate oligomer having an aliphatic cyclic structure is preferable, a (meth)acrylate oligomer having a dicyclohexylmethane structure and a urethane (meth)acrylate oligomer having an isophorone structure are more preferable, a (meth)acrylate oligomer having a dicyclohexylmethane structure is even more preferable, and an acrylate oligomer having a dicyclohexylmethane structure is particularly preferable. By using an oligomer as the ethylenically unsaturated compound (A2), it becomes easy to obtain a model material having an appropriate strength. These ethylenically unsaturated compounds (A2) may be used singly or two or more thereof may be used in combination.

In addition, in the present description, the "oligomer" refers to a molecule having a weight average molecular weight (Mw) of 500 to 10,000. The weight average molecular weight (Mw) of the oligomer is preferably 800 or more, and more preferably more than 1,000. The weight average molecular weight (Mw) means a polystyrene-equivalent weight average molecular weight measured by GPC (gel permeation chromatography).

The content of the ethylenically unsaturated compound (A2) in the model material clear composition of the present invention is preferably 10% by mass or more, more preferably 11% by mass or more, even more preferably 15% by mass or more, particularly preferably 18% by mass or more, and especially preferably 20% by mass or more based on the total mass of the ethylenically unsaturated compound (A). When the content of the ethylenically unsaturated compound (A2) based on the total mass of the ethylenically unsaturated compound (A) is equal to or more than the above-mentioned lower limit, a resulting model material tends to have an improved strength. On the other hand, for example, in order to sufficiently exhibit the effect of suppressing coloring (yellowing) and the effect of improving transparency of the model material by using the ethylenically unsaturated monomer (A1) as a polymerizable compound, the content of the ethylenically unsaturated compound (A2) is preferably 50% by mass or less, more preferably 45% by mass or less, even more preferably 40% by mass or less, particularly preferably 35% by mass or less, especially preferably 29% by mass or less, and still especially preferably 25% by mass or less based on the total mass of the ethylenically unsaturated compound (A).

<Mass Ratio of (A1) to (A2)>

In the model material clear composition of the present invention, the mass ratio of the ethylenically unsaturated monomer (A1) to the ethylenically unsaturated compound (A2) [ethylenically unsaturated monomer (A1)/ethylenically unsaturated compound (A2)] can be appropriately determined according to the type of the polymerizable compound to be used, the mechanical characteristics of a desired model material. The mass ratio of the ethylenically unsaturated monomer (A1) to the ethylenically unsaturated compound (A2) is, for example, preferably 1.1 or more, more preferably 1.5 or more, and even more preferably 2 or more, and is preferably 10 or less, more preferably 8 or less, even more preferably 7 or less, and particularly preferably 5 or less. When the mass ratio of the ethylenically unsaturated monomer (A1) to the ethylenically unsaturated compound (A2) is within the above range, it becomes easy to impart appropriate mechanical characteristics to a resulting model material while securing a high transparency with little yellowness in the model material.

When the model material clear composition contains the ethylenically unsaturated monomer (A1), the ethylenically unsaturated compound (A2), or the model material clear composition contains a plurality of ethylenically unsaturated monomers (A1) and a plurality of ethylenically unsaturated compounds (A2), it is preferable that the mass ratio in the total mass of the respective polymerizable compounds is within the above range.

<Ethylenically Unsaturated Monomer (A3)>

The model material clear composition of the present invention preferably comprises, as the ethylenically unsaturated compound (A), an ethylenically unsaturated monomer (A3) other than the ethylenically unsaturated monomer (A1) and the ethylenically unsaturated compound (A2) (hereinafter, also simply referred to as "ethylenically unsaturated monomer (A3)"). Similarly to the ethylenically unsaturated compound (A2), the ethylenically unsaturated monomer (A3) tends to impart a desired strength to a model material obtained from the model material clear composition. When the ethylenically unsaturated compound (A2) and the ethylenically unsaturated monomer (A3) are used in combination, it is easy to impart a high strength to a resulting model material while sufficiently securing the effect of suppressing coloring (yellowing) and the effect of improving transparency of the model material, both the effects being derived from the use of the ethylenically unsaturated monomer (A1). This makes it possible to obtain a model material that is less yellowish, has a high transparency, is superior in appearance characteristics, and has appropriate mechanical characteristics.

The ethylenically unsaturated monomer (A3) is not particularly limited as long as it is a polymerizable compound that has at least one ethylenic double bond in the molecule and that is different from the ethylenically unsaturated monomer (A1) and the ethylenically unsaturated compound (A2), and may be any of a monomer, an oligomer, and a polymer. In addition, the monomer may be a monofunctional monomer or a polyfunctional monomer. Examples of the ethylenically unsaturated monomer (A3) include monofunctional (meth)acrylates having an aliphatic cyclic structure other than a cyclopentenyl group and a cyclopentanyl group and not containing a urethane group and an amide group, di- or more functional (meth)acrylates having an aliphatic cyclic structure other than a cyclopentenyl group and a cyclopentanyl group and not containing a urethane group and an amide group, ethylenically unsaturated compounds having no aliphatic cyclic structure in the molecule, for example, alkyl (meth)acrylates having a linear or branched alkyl group, (meth)acrylates having an aromatic cyclic structure or a heterocyclic structure in the molecule, and monofunctional ethylenically unsaturated monomers containing a nitrogen atom such as (meth)acrylamides and N-vinyllactams. These ethylenically unsaturated monomers (A3) may be used singly or two or more thereof may be used in combination.

In the present description, the aromatic ring structure refers to an aromatic cyclic structure in which carbon atoms are cyclically bonded, and the heterocyclic structure refers to a structure in which carbon atoms and one or more heteroatoms are cyclically bonded.

In the present invention, the ethylenically unsaturated monomer (A3) is preferably an ethylenically unsaturated monomer having neither an aromatic group nor a vinyl ether group as well as neither a urethane group nor an amide group. The ethylenically unsaturated monomer (A3) preferably has at least one group selected from the group consisting of a cyclohexyl group, a 4-t-butylcyclohexyl group, a 3,5,5-trimethylcyclohexyl group, an isobornyl group, a tricyclodecanyl group, a dicyclopentadienyl group, and a 1,4-cyclohexanedimethanol group, and more preferably contains neither a urethane group nor an amide group as well as neither an aromatic group nor a vinyl ether group and has at least one group selected from the group consisting of a cyclohexyl group, a 4-t-butylcyclohexyl group, a 3,5,5-trimethylcyclohexyl group, an isobornyl group, a tricyclodecanyl group, a dicyclopentadienyl group and a 1,4-cyclohexanedimethanol group. When the ethylenically unsaturated monomer (A3) has the structure described above, the glass transition temperature of the model material clear composition tends to increase, and a desired strength tends to be imparted to a resulting model material.

In the present invention, the ethylenically unsaturated monomer (A3) is preferably an ethylenically unsaturated monomer having a nitrogen atom in the molecule and having no aliphatic cyclic structure. When the ethylenically unsaturated monomer (A3) has the structure described above, a resulting model material tends to have an improved hardness. Examples of the ethylenically unsaturated monomer (A3) include (meth)acrylamides, N-vinyllactams, and N-vinylformamide.

Specific examples of the ethylenically unsaturated monomer (A3) include cyclohexyl acrylate, 4-t-butylcyclohexyl acrylate, 3,5,5-trimethylcyclohexyl acrylate, isobornyl acrylate, tricyclodecanedimethanol diacrylate, dicyclopentadienyl methacrylate, 1,4-cyclohexanedimethanol monoacrylate, N,N-dimethylacrylamide, N,N-diethylacrylamide, N-isopropylacrylamide, hydroxyethylacrylamide, hydroxypropylacrylamide, N-vinylpyrrolidone, acryloylmorpholine, N-vinylcaprolactam, hexanediol diacrylate, tripropylene glycol diacrylate, cyclic trimethylolpropane formal acrylate and phenoxyethyl acrylate. Among them, it is preferable to contain one compound selected from the group consisting of cyclohexyl acrylate, 4-t-butylcyclohexyl acrylate, 3,5,5-trimethylcyclohexyl acrylate, isobornyl acrylate, tricyclodecanedimethanol diacrylate, 1,4-cyclohexanedimethanol monoacrylate, acryloylmorpholine, N-vinylcaprolactam, hexanediol diacrylate, tripropylene glycol diacrylate, cyclic trimethylolpropane formal acrylate, and phenoxyethyl acrylate, and 3,5,5-trimethylcyclohexyl acrylate, isobornyl acrylate, acryloylmorpholine, and tripropylene glycol diacrylate are more preferable. These ethylenically unsaturated monomers (A3) may be used singly or two or more thereof may be used in combination.

Among them, acryloylmorpholine is preferable because it has a high glass transition temperature and a high curability, so that a high hardness can be imparted to a resulting model material. In addition, since acryloylmorpholine suitably functions as a diluent, an oligomer component useful for improving the brittling resistance of a resulting model material, for example, the ethylenically unsaturated compound (A2) can be blended more in the model material clear composition while maintaining the viscosity of the model material clear composition in an appropriate range. Therefore, by containing acryloylmorpholine, a model material having both a high hardness and an appropriate toughness in a well-balanced manner can be obtained.

The content of the ethylenically unsaturated monomer (A3) in the model material clear composition of the present invention is preferably 5% by mass or more, more preferably 10% by mass or more, even more preferably 15% by mass or more, and particularly preferably 21% by mass or more based on the total mass of the ethylenically unsaturated compound (A). When the content of the ethylenically unsaturated monomer (A3) based on the total mass of the ethylenically unsaturated compound (A) is equal to or more than the above-mentioned lower limit, a resulting model material tends to have an improved strength. On the other hand, for example, in order to sufficiently exhibit the effect of suppressing coloring (yellowing) and the effect of improving transparency of a model material, both the effects being derived from the use of the ethylenically unsaturated monomer (A1) as the polymerizable compound, the content of the ethylenically unsaturated monomer (A3) is preferably 50% by mass or less, more preferably 45% by mass or less, even more preferably 40% by mass or less, particularly preferably 35% by mass or less, and especially preferably less than 30% by mass based on the total mass of the ethylenically unsaturated compound (A).

<Mass Ratio of (A1) to (A3)>

In the model material clear composition of the present invention, the mass ratio of the ethylenically unsaturated monomer (A1) to the ethylenically unsaturated monomer (A3) [ethylenically unsaturated monomer (A1)/ethylenically unsaturated monomer (A3)] can be appropriately determined according to the type of the polymerizable compound to be used and the mechanical characteristics of a desired model material. The mass ratio of the ethylenically unsaturated monomer (A1) to the ethylenically unsaturated monomer (A3) is preferably 1.5 or more, more preferably 1.8 or more, and even more preferably more than 2, and is preferably 10 or less, more preferably 8 or less, even more preferably 7 or less, and particularly preferably 5 or less. When the mass ratio of the ethylenically unsaturated monomer (A1) to the ethylenically unsaturated monomer (A3) is within the above range, it becomes easy to impart well-balanced mechanical characteristics to a resulting model material while securing a high transparency with suppressed yellowness in the model material.

When the model material clear composition contains the ethylenically unsaturated monomer (A1), the ethylenically unsaturated monomer (A3), or a plurality of ethylenically unsaturated monomers (A1) and a plurality of ethylenically unsaturated monomers (A3), it is preferable that the mass ratio in the total mass of the respective polymerizable compounds is within the above range.

<Mass Ratio of (A2) to (A3)>

In the model material clear composition of the present invention, the mass ratio of the ethylenically unsaturated compound (A2) to the ethylenically unsaturated monomer (A3) [ethylenically unsaturated compound (A2)/ethylenically unsaturated monomer (A3)] can be appropriately determined according to the type of the polymerizable compound to be used and the mechanical characteristics of a desired model material. The mass ratio of the ethylenically unsaturated compound (A2) to the ethylenically unsaturated monomer (A3) is preferably 0.5 or more, and more preferably 0.8 or more, and is preferably 2.5 or less, more preferably 2 or less, and even more preferably 1.4 or less. When the mass ratio of the ethylenically unsaturated compound (A2) to the ethylenically unsaturated monomer (A3) is within the above range, an appropriate strength tends to be imparted to a resulting model material.

When the model material clear composition contains the ethylenically unsaturated compound (A2), the ethylenically unsaturated monomer (A3), or a plurality of ethylenically unsaturated compounds (A2) and a plurality of ethylenically unsaturated monomers (A3), it is preferable that the mass ratio in the total mass of the respective polymerizable compounds is within the above range.

<Mass Ratio of (A1) to (A2) and (A3)>

In the model material clear composition of the present invention, the mass ratio of the total mass of the ethylenically unsaturated monomer (A1) to the total mass of the ethylenically unsaturated compound (A2) and the ethylenically unsaturated monomer (A3) [ethylenically unsaturated monomer (A1)/ethylenically unsaturated compound (A2)+ethylenically unsaturated monomer (A3)] can be appropriately determined according to the type of the polymerizable compound to be used and the mechanical characteristics of a desired model material. The mass ratio is preferably 0.5 or more, more preferably 0.9 or more, even more preferably 1 or more, and particularly preferably more than 1, and is preferably 4 or less, more preferably 3 or less, and even more preferably 2 or less. When the mass ratio of the ethylenically unsaturated monomer (A1) to the ethylenically unsaturated compound (A2) and the ethylenically unsaturated monomer (A3) is within the above range, it becomes easy to impart well-balanced mechanical characteristics to a resulting model material while securing a high transparency with little yellowness in the model material.

<Polymerizable Compound Other than (A)>

The model material clear composition of the present invention may comprise a polymerizable compound other than the ethylenically unsaturated compound (A) as a polymerizable compound. Examples of such other polymerizable compound include oxygen-containing cyclic compounds such as oxirane compounds and oxetane compounds, and nitrogen-containing cyclic compounds such as aziridine compounds and acetidine compounds. When the model material clear composition of the present invention comprises a polymerizable compound other than the ethylenically unsaturated compound (A), the content thereof is preferably 15% by mass or less, more preferably 10% by mass or less, and even more preferably 5% by mass or less based on the total mass of the ethylenically unsaturated compound (A).

<Content of (A)>

The content of the ethylenically unsaturated compound (A) to be used in the model material clear composition of the present invention is preferably 80% by mass or more, more preferably 85% by mass or more, and even more preferably 90% by mass or more based on the total mass of the model material clear composition. When the content of the ethylenically unsaturated compound (A) in a model material clear composition is equal to or more than the above-mentioned lower limit, a model material clear composition that tends to impart a high transparency with suppressed yellowness and well-balanced mechanical characteristics to a resulting model material is obtained. The upper limit of the content of the ethylenically unsaturated compound (A) is not particularly limited, but is usually 99% by mass or less, and preferably 98% by mass or less based on the total mass of the model material clear composition.

<Content of Polymerizable Compound>

The content of the polymerizable compounds to be used in the model material clear composition of the present invention is preferably 90% by mass or more, and more preferably 95% by mass or more, and is preferably 99.9% by mass or less, and more preferably 99.5% by mass or less based on the total mass of the model material clear composition.

[Additive Composition (B)]

The model material clear composition of the present invention comprises an additive composition (B) comprising a specific photopolymerization initiator, a specific polymerization inhibitor, and a specific antioxidant. By containing the additive composition (B), characteristics superior in the preservation stability and the curability of an ink and the transparency of a cured product are realized. In particular, when the contents (% by mass) of the initiator, the polymerization inhibitor, and the antioxidant satisfy the following Formulae (1) and (2), the curability of the model material clear composition is secured and the preservation stability of the composition is improved. In addition, the occurrence of yellowing due to photocuring of the ethylenically unsaturated monomer is suppressed, and it becomes easy to impart a high transparency and a crystal-like color tone.

$$\text{content of photopolymerization initiator} \geq \text{content of polymerization inhibitor} \geq \text{content of antioxidant} \quad (1)$$

$$1 \leq \sqrt{\text{content of photopolymerization initiator}/[(\text{content of polymerization inhibitor} \times 10))^2 + (\text{content of antioxidant} \times 100)^2]} \leq 800 \quad (2)$$

The upper limit value of the Formula (2) is preferably 760, more preferably 520, and even more preferably 440. When the upper limit value of the Formula (2) is the above value, the curability of the model material clear composition is improved, and the model material clear composition can be cured with a smaller integrated light quantity. The lower limit value of the Formula (2) is preferably 1.3, more preferably 6.3, and even more preferably 10.0. When the lower limit value of Formula (2) is the above value, the viscosity change rate of the model material clear composition decreases during a preservation for a long period of time, and the preservation stability of the model material clear composition increases.

<Photopolymerization Initiator>

The photopolymerization initiator to be used in the present invention is at least one photopolymerization initiator selected from the group consisting of α-hydroxyacetophenone-based photopolymerization initiators and acylphosphine oxide-based photopolymerization initiators. The photopolymerization initiator is preferably an initiator that does not absorb visible light or a photopolymerization initiator the yellowness of which disappears after curing (photobleaching). Specific examples of the photopolymerization initiator include 1-hydroxycyclohexyl phenyl ketone, 2-hydroxy-2-methyl-1-phenyl-propan-1-one, 1-[4-(2-hydroxyethoxy)-phenyl]-2-hydroxy-2-methyl-1-propan-1-one, 2,2'-dihydroxy-2,2'-dimethyl-1,1'-[methylenebis(4,1-phenylene)]bis(propan-1-one), 2,4,6-trimethylbenzoyl-diphenylphosphine oxide, and bis(2,4,6-trimethylbenzoyl)-phenyl-phosphine oxide. Among them, from the viewpoint that a model material obtained when the model material clear composition is photocured is less likely to yellow and the viewpoint that the resulting model material has a high light resistance and the like and is less likely to turn yellowish over time, the photopolymerization initiator preferably comprises at least one compound selected from the group consisting of 1-hydroxycyclohexyl phenyl ketone, 2,4,6-trimethylbenzoyl-diphenylphosphine oxide, and bis(2,4,6-trimethylbenzoyl)-phenyl-phosphine oxide. These photopolymerization initiators may be used singly or two or more thereof may be used in combination. As the photopolymerization initiator, a commercially available product may be used, and examples thereof include Omnirad TPO (manufactured by IGM RESINS B.V.), Omnirad 819 (manufactured by IGM RESINS B.V.), and Omnirad 184 (manufactured by IGM RESINS B.V.).

The content of the photopolymerization initiator in the model material clear composition is preferably 0.5% by mass or more, more preferably 1.0% by mass or more, and even more preferably 3.0% by mass or more, and is preferably 15.0% by mass or less, more preferably 10.0% by mass or less, and even more preferably 5.0% by mass or less based on the total mass of the model material clear composition. When the content of the photopolymerization initiator is within the above range, unreacted polymerizable components can be reduced to sufficiently enhance the curability of the model material, and yellowing with time of the model material caused by remaining of the unreacted photopolymerization initiator can be suppressed.

<Polymerization Inhibitor>

The polymerization inhibitor of the present invention is a hindered amine-based polymerization inhibitor (HALS). The polymerization inhibitor can enhance the preservation stability of the model material clear composition. In addition, the polymerization inhibitor can prevent head clogging caused by the polymerization of a polymerizable compound by heat energy. As the polymerization inhibitor, compounds having a piperidine skeleton are preferable, and compounds having a 2,2,6,6-tetramethylpiperidine skeleton are more preferable. Among the above, compounds having a 2,2,6,6-tetramethylpiperidinyloxy group are preferable. Specific examples thereof include esters of 2,2,6,6-tetramethylpiperidine-N-oxyl, 4-hydroxy-2,2,6,6-tetramethylpiperidine-N-oxyl, 4-benzoyloxy-2,2,6,6-tetramethylpiperidine-N-oxyl, and 4-hydroxy-2,2,6,6-tetramethylpiperidine-N-oxyl, compounds having two 2,2,6,6-tetramethylpiperidinyloxy groups in one molecule, e.g., bis(1-oxyl-2,2,6,6-tetramethylpiperidin-4-yl) sebacate and bis(2,2,6,6-tetramethyl-1-(octyloxy)-4-piperidinyl) decanedioate. Among them, from the viewpoint of enhancing the preservation stability, the polymerization inhibitor preferable comprises at least one compound selected from the group consisting of 4-hydroxy-2,2,6,6-tetramethylpiperidine-N-oxyl and 2,2,6,6-tetramethylpiperidine-1-oxyl. These polymerization inhibitors may be used singly or two or more thereof may be used in combination. As the polymerization inhibitor, a commercially available product may be used, and examples thereof include H-TEMPO (manufactured by Evonik Degussa Japan Co., Ltd.), IRGASTAB UV-10 (manufactured by BASF), TINUVIN 111 FDL (manufactured by BASF), TINUVIN 144 (manufactured by BASF), and TINUVIN 292 (manufactured by BASF).

The content of the polymerization inhibitor in the model material clear composition is preferably 0.01% by mass or more, more preferably 0.05% by mass or more, and even more preferably 0.1% by mass or more, and is preferably 5.0% by mass or less, more preferably 3.0% by mass or less, and even more preferably 1.0% by mass or less based on the total mass of the model material clear composition. When the content of the polymerization inhibitor is within the above range, a model material clear composition having higher preservation stability and suppressed to cause head clogging can be obtained.

<Antioxidant>

The antioxidant of the present invention is a phenolic antioxidant. In the present invention, the phenolic antioxidant means an antioxidant having a phenolic hydroxyl group as a basic skeleton, and examples thereof include 2,6-di-tert-butyl-4-methylphenol, 2,6-di-tert-butyl-4-ethylphenol, mono-, di- or tri-(α-methylbenzyl)phenol, 2,2'-methylenebis(4-ethyl-6-tert-butylphenol), 2,2'-methylenebis(4-methyl-6-tert-butylphenol), 4,4'-butylidenebis(3-methyl-6-tert-butylphenol), 4,4'-thiobis(3-methyl-6-tert-butylphenol), 2,5-di-tert-butylhydroquinone, 2,5-di-tert-amylhydroquinone, triethylene glycol-bis-[3-(3-t-butyl-5-methyl-4-hydroxyphenyl) propionate], 1,6-hexanediol-bis[3-(3,5-di-t-butyl-4-hydroxyphenyl) propionate], 2,4-bis-(n-octylthio)-6-(4-hydroxy-3,5-di-t-butylanilino)-1,3,5-triazine, pentaerythritol=tetrakis[3-(3',5'-di-tert-butyl-4'-hydroxyphenyl)propionate], 2,2-thio-diethylenebis[3-(3,5-di-t-butyl-4-hydroxyphenyl) propionate], octadecyl-3-(3,5-di-tert-butyl-4-hydroxyphenyl) propionate, N,N'-hexamethylenebis(3,5-di-t-butyl-4-hydroxy-hydrocinnamamide), 3,5-di-t-butyl-4-hydroxybenzyl phosphonate-diethyl ester, 1,3,5-trimethyl-2,4,6-tris(3,5-di-t-butyl-4-hydroxybenzyl)benzene, bis(ethyl 3,5-di-t-butyl-4-hydroxybenzylphosphonate) calcium, tris-(3,5-di-t-butyl-4-hydroxybenzyl) isocyanurate, 2,4-2,4-bis[(octylthio)methyl]o-cresol, N, N'-bis[3-(3,5-di-t-butyl-4-hydroxyphenyl)propionyl]hydrazine, tris(2,4-di-t-butylphenyl)phosphite, 2-(5-methyl-2-hydroxyphenyl)benzotriazole, 2-[2-hydroxy-3,5-bis(α,α-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-(2'-hydroxy-5'-t-octylphenyl)-benzotriazole, condensates with methyl-3-[3-t-butyl-5-(2H-benzotriazol-2-yl)-4-hydroxyphenyl]propionate-polyethylene glycol (molecular weight: about 300), droxyphenylbenzotriazole derivatives, 2-(3,5-di-t-butyl-4-hydroxybenzyl)-2-n-butylmalonic acid bis(1,2,2,6,6-pentamethyl-4-piperidyl), 2,4-di-t-butylphenyl 3,5-di-t-butyl-4-hydroxybenzoate, 4-methoxyphenol, 2,6-di-t-butyl-p-cresol, and 1,4-dihydroxybenzene. Among them, 1,4-dihydroxybenzene, 4-methoxyphenol, and 2,6-di-t-butyl-p-cresol are preferable, and 4-methoxyphenol and 2,6-di-t-butyl-p-cresol are more preferable. The phenolic antioxidant may be used singly or two or more thereof may be used in combination. As the phenolic antioxidant, a commercially available product may be used, and examples thereof include hydroquinone monomethyl ether (manufactured by Tokyo Chemical Industry Co., Ltd.) and butylhydroxytoluene (manufactured by Tokyo Chemical Industry Co., Ltd.).

The content of the antioxidant in the model material clear composition is preferably 0.001% by mass or more, more preferably 0.01% by mass or more, and even more preferably 0.05% by mass or more, and is preferably 3% by mass or less, more preferably 1% by mass or less, and even more preferably 0.2% by mass or less based on the total mass of the model material clear composition. When the content of the antioxidant is within the above range, deterioration of a model material due to discoloration with time caused by an oxidation reaction or the like is suppressed and a model material superior in transparency can be realized.

The model material clear composition may comprise, as necessary, other additives unless the effects of the present invention are impaired. Examples of such other additives include surface adjusting agents, preservation stabilizers, ultraviolet absorbing agents, light stabilizers, chain transfer agents, and fillers, dilution solvents, and thickeners.

<Surface Adjusting Agent>

The additive composition (B) may comprise a surface adjusting agent. The surface adjusting agent is a component that adjusts the surface tension of the model material clear composition to an appropriate range, and the type thereof is not particularly limited. By setting the surface tension of the model material clear composition to an appropriate range, the jettability can be stabilized and the interface mixing between the model material clear composition and the support material composition can be suppressed. As a result, a model material with a good dimensional accuracy can be obtained.

Examples of the surface adjusting agent include silicone-based compounds. Examples of the silicone-based compounds include silicone-based compounds having a polydimethylsiloxane structure. Specific examples thereof include polyether-modified polydimethylsiloxane, polyester-modified polydimethylsiloxane, and polyaralkyl-modified polydimethylsiloxane. As these, BYK-300, BYK-302, BYK-306, BYK-307, BYK-310, BYK-315, BYK-320, BYK-322, BYK-323, BYK-325, BYK-330, BYK-331, BYK-333, BYK-337, BYK-344, BYK-370, BYK-375, BYK-377, BYK-UV3500, BYK-UV3510, BYK-UV3570 (manufactured by BYK-Chemie GmbH), TEGO-Rad 2100, TEGO-Rad 2200N, TEGO-Rad 2250, TEGO-Rad 2300, TEGO-Rad 2500, TEGO-Rad 2600, TEGO-Rad 2700 (manufactured by Degussa AG), Granol 100, Granol 115, Granol 400, Granol 410, Granol 435, Granol 440, Granol 450, B-1484, POLYFLOW ATF-2, KL-600, UCR-L72, UCR-L93 (manufactured by KYOEISHA CHEMICALS Co., LTD.) and the like under the trade names may be used. In addition, a surface adjusting agent other than the silicone-based compound (for example, a fluorine-based surface adjusting agent) may be used. These may be used singly or two or more thereof may be used in combination.

When the model material clear composition contains a surface adjusting agent, the content thereof is preferably 0.005% by mass or more, more preferably 0.01% by mass or more, and even more preferably 0.05% by mass or more, and is preferably 3% by mass or less, more preferably 2% by mass or less, and even more preferably 1.5% by mass or less based on the total mass of the model material clear composition. When the content of the surface adjusting agent is within the above-mentioned range, it is easy to adjust the surface tension of the model material clear composition.

[Coloring Agent (C)]

The model material clear composition of the present invention usually does not contain a coloring agent, but may contain a pigment, a dye, or both a pigment and a dye in a small amount. The content of the coloring agent in the model material clear composition of the present invention is usually 0.1% by mass or less, more preferably 0.01% by mass or less, even more preferably 0.001% by mass or less, and particularly preferably 0.0001% by mass or less based on the total mass of the model material clear composition, and the lower limit thereof is 0% by mass or more. Examples of the coloring agent include color materials having an absorption wavelength of 530 to 620 nm, and specific examples thereof include anthraquinone-based and phthalocyanine-based color materials, e.g., 1-hydroxy-4-toluidinoanthraquinone, and preferred is 1-hydroxy-4-toluidinoanthraquinone. These coloring agents may be used singly, or two or more thereof may be used in combination. In addition, two or more coloring agents may be mixed and adjusted to have an absorption wavelength of 530 to 620 nm. As the coloring agent, a commercially available product may be used, and examples thereof include Quinizarin Blue (manufactured by Tokyo Chemical Industry Co., Ltd.).

[Characteristics of Model Material Clear Composition]

The model material clear composition of the present invention preferably has a viscosity of 1 mPa·s or more and less than 500 mPa·s at 25° C. for use in a material-jet optical shaping process. The viscosity at 25° C. is preferably from 10 to 400 mPa·s, more preferably from 20 to 300 mPa·s, and even more preferably from 25 to 100 mPa·s from the viewpoint of improving jettability from a material jetting nozzle. The viscosity can be measured using a R100 type viscometer in accordance with JIS Z 8803. The viscosity of the model material clear composition can be controlled by adjusting the type and blending ratio of a polymerizable compound, and the type and addition amount of a dilution solvent and a thickener.

Preferably, when the model material clear composition of the present invention is preserved in an environment of 60° C. for 30 days, the viscosity of the model material clear composition does not change more than 10%. If the viscosity change rate of the model material clear composition exceeds 10%, the jettability of the model material clear composition may be deteriorated when time elapses. The viscosity change of the model material clear composition is preferably less than 5%, and more preferably less than 3%.

The surface tension of the model material clear composition of the present invention is preferably from 24 to 34 mN/m, and more preferably from 28 to 30 mN/m. When the surface tension is within the above range, the droplet jetted through a nozzle can be normally formed even at the time of high-speed jetting in material jet, an appropriate droplet amount is easily secured, and it becomes easy to improve the shaping accuracy. In the present invention, the surface tension of the model material clear composition can be controlled by adjusting the type and blending amount of the surface adjusting agent.

The method for producing the model material clear composition of the present invention is not particularly limited, and for example, the model material clear composition can be produced by uniformly mixing components constituting the model material clear composition using a mixing and stirring device.

[Composition Set for Material-Jet Optical Shaping]

The model material clear composition of the present invention is suitable for the preparation of a colorless model material superior in transparency, and can provide a model material having various appearances and surface textures in combination with the model material color composition. Therefore, the present invention is also directed to a composition set for material-jet optical shaping, comprising the model material clear composition of the present invention and a model material color composition for use in a material-jet optical shaping process.

[Model Material Color Composition]

The model material clear composition of the present invention can be used in combination with various conventionally known model material color compositions. The model material color composition that can be suitably used together with the model material clear composition of the present invention may be a model material color composition comprising an ethylenically unsaturated monomer (D), preferably comprising, based on the total mass of the model material color composition, 30% by mass or more and 85% by mass or less of a (meth)acrylate-based ethylenically unsaturated monomer (D1) and 10% by mass or more and 50% by mass or less of a nitrogen atom-containing ethylenically unsaturated monomer (D2) that is not a (meth)acrylate-based compound.

The model material color composition contained in the composition set for material-jet optical shaping of the present invention comprises an ethylenically unsaturated monomer (D). The ethylenically unsaturated monomer (D) is a polymerizable monomer having at least one ethylenic double bond in the molecule and having a property of being cured with energy rays. The ethylenically unsaturated monomer (D) may be either a monofunctional ethylenically unsaturated monomer having one ethylenic double bond in the molecule or a polyfunctional ethylenically unsaturated monomer having two or more ethylenic double bonds in the molecule. Examples of the ethylenically unsaturated monomer (D) include (meth)acrylates, (meth)acrylamides, N-vinyllactams, vinyl ethers, and maleimides.

The model material color composition contained in the composition set for material-jet optical shaping of the present invention preferably comprises a (meth)acrylate-based ethylenically unsaturated monomer (D1) (hereinafter, also simply referred to as "ethylenically unsaturated monomer (D1)") as the ethylenically unsaturated monomer (D). The ethylenically unsaturated monomer (D1) may be a monofunctional (meth)acrylate (monofunctional ethylenically unsaturated monomer), or a polyfunctional (meth)acrylate (polyfunctional ethylenically unsaturated monomer). Examples of the (meth)acrylate include alkyl (meth)acrylates having a linear or branched alkyl group, (meth)acrylates having an aliphatic cyclic structure and/or an aromatic cyclic structure in the molecule, (meth)acrylates having a heterocyclic structure, (meth)acrylates having a linear or branched alkylene group, and alkylene glycol (meth)acrylates having a linear or branched alkylene glycol group. These may be used singly or two or more thereof may be used in combination.

Examples of the linear or branched alkyl group in the alkyl (meth)acrylates include preferably alkyl groups having 4 to 30 carbon atoms, and more preferably those having 6 to 25 carbon atoms, and specific examples thereof include an octyl group, an isooctyl group, a 2-ethylhexyl group, a nonyl group, an isononyl group, a lauryl group, a stearyl group, an isostearyl group, and a t-butyl group. The alkyl (meth)acrylate is usually a monofunctional (meth)acrylate.

The (meth)acrylate having an aliphatic cyclic structure and/or an aromatic cyclic structure has an alicyclic group and/or an aromatic hydrocarbon group in the molecule, and examples of these groups preferably include alicyclic groups and aromatic hydrocarbon groups having 6 to 20 carbon atoms, and more preferably include those having 8 to 14 carbon atoms. Examples of the alicyclic group include a cyclohexyl group, a 4-t-butylcyclohexyl group, an isobornyl group, a dicyclopentanyl group, a tricyclodecyl group, and an adamantyl group. Examples of the aromatic hydrocarbon group include a phenoxyethyl group, an ethoxylated phenyl group (e.g., a 2-(2-ethoxyethoxy)phenyl) group, a phenylphenol group, and a fluorene group. The (meth)acrylate having an aliphatic cyclic structure and/or an aromatic cyclic structure may be either monofunctional or polyfunctional, but it is preferably a monofunctional (meth)acrylate.

The (meth)acrylate having a heterocyclic structure has a heterocyclic group in the molecule, and examples of the heterocyclic group preferably include heterocyclic groups having 5 to 20 carbon atoms, and more preferably include those having 5 to 14 carbon atoms. Examples of the (meth)acrylates having a heterocyclic structure include tetrahydrofurfuryl (meth)acrylate, 4-(meth)acryloyloxymethyl-2-methyl-2-ethyl-1,3-dioxolane, and 4-(meth)acryloyloxymethyl-2-cyclohexyl-1,3-dioxolane. The (meth)acrylate having a heterocyclic structure may be either monofunctional or polyfunctional, but it is preferably a monofunctional (meth)acrylate.

Examples of the alkylene group in the (meth)acrylate having a linear or branched alkylene group preferably include alkylene groups having 2 to 30 carbon atoms, and more preferably include those having 3 to 20 carbon atoms. Examples of such alkylene groups include a pentaerythritol group, a dipentaerythritol group, and a dimethyloltricyclodecane group. Examples of the (meth)acrylate having a linear or branched alkylene group include specifically pentaerythritol tri(meth)acrylate, dipentaerythritol hexa(meth)acrylate, and dimethyloltricyclodecane di(meth)acrylate. The (meth)acrylate having a linear or branched alkylene group is usually a polyfunctional (meth)acrylate, and is preferably a polyfunctional (meth)acrylate having 2 to 10, and more preferably 2 to 6 (meth)acrylate groups.

Examples of the alkylene glycol group in the (meth)acrylate having a linear or branched alkylene glycol group preferably include alkylene glycol groups having 4 to 25 carbon atoms, and more preferably include those having 6 to 20 carbon atoms. Examples of the alkylene glycol group include a tripropylene glycol group, a 1,6-hexanediol group, a neopentyl glycol group, a 1,9-nonanediol group, a 3-methyl-1,5-pentanediol group, a 2-n-butyl-2-ethyl-1,3-propanediol group, a pentaerythritol group, (n)ethylene glycol groups such as a diethylene glycol group and a triethylene glycol group, and (n)propylene glycol groups such as a dipropylene glycol group and a tripropylene glycol group. Examples of the (meth)acrylate having a linear or branched alkylene glycol group include specifically di(meth)acrylates of the above-mentioned alkylene glycols and tri(meth)acrylates of the above-mentioned alkylene glycols. The (meth)acrylate having a linear or branched alkylene glycol group may be either monofunctional or polyfunctional, but it is preferably a polyfunctional (meth)acrylate having 1 to 6, and more preferably 2 or 3 (meth)acrylate groups.

From the viewpoint of being easy to decrease the viscosity of a model material color composition to enhance the jettability in material jetting and from the viewpoint of being easy to enhance the strength and hardness of a resulting model material, the composition preferably comprises, as the ethylenically unsaturated monomer (D1), a (meth)acrylate-based ethylenically unsaturated monomer having an aliphatic cyclic structure and/or an aromatic cyclic structure, more preferably comprises a (meth)acrylate-based ethyleni-cally unsaturated monomer having an aliphatic cyclic structure, and even more preferably comprises isobornyl (meth)acrylate and/or cyclohexyl (meth)acrylate.

The content of the ethylenically unsaturated monomer (D1) contained in the model material color composition is preferably 30% by mass or more, more preferably 35% by mass or more, even more preferably 40% by mass or more, and particularly preferably 45% by mass or more, and is preferably 85% by mass or less, more preferably 75% by mass or less, even more preferably 70% by mass or less, and particularly preferably 65% by mass or less based on the total mass of the model material color composition. When the content of the ethylenically unsaturated monomer (D1) is equal to or more than the above-mentioned lower limit, the viscosity of the model material color composition is easily controlled, and a good jettability from a nozzle is easily secured. When the content of the ethylenically unsaturated monomer (D1) is equal to or less than the above-mentioned upper limit, a high strength and hardness tend to be imparted to a resulting model material, and the dimensional stability of the model material tends to be improved.

The model material color composition contained in the composition set for material-jet optical shaping of the present invention preferably comprises a nitrogen atom-containing ethylenically unsaturated monomer (D2) that is not a (meth)acrylate-based compound (hereinafter, also simply referred to as "nitrogen atom-containing ethylenically unsaturated monomer (D2)") as the ethylenically unsaturated monomer (D). In the present description, the ethylenically unsaturated monomer (D2) is not a (meth)acrylate, and the nitrogen atom-containing ethylenically unsaturated monomer (D2) does not encompass any (meth)acrylates having a nitrogen atom.

The nitrogen atom-containing ethylenically unsaturated monomer (D2) contained in the model material color composition may be either a monofunctional nitrogen atom-containing ethylenically unsaturated monomer (monofunctional ethylenically unsaturated monomer), or a polyfunctional nitrogen atom-containing ethylenically unsaturated monomer (polyfunctional ethylenically unsaturated monomer). Examples of the nitrogen atom-containing ethylenically unsaturated monomer (D2) include (meth)acrylamides, N-vinyllactams, maleimides, and N-vinylformamide. These may be used singly or two or more thereof may be used in combination.

Examples of the (meth)acrylamides include monofunctional or polyfunctional (meth)acrylamide compounds represented by the following Formula (3):

[Chem. 1]

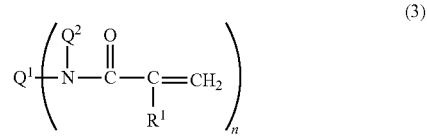

(3)

wherein, $Q^1$ represents an n-valent linking group, $Q^2$s each independently represent a hydrogen atom or a monovalent organic group, $R^1$s each independently represent a hydrogen atom or a methyl group, and n represents an integer of 1 or 2 or more, and monofunctional compounds represented by the following Formula (4):

[Chem. 2]

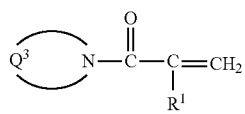

(4)

wherein, $Q^3$ represents an optionally substituted divalent linking group which forms an alicyclic structure together with an N atom, and $R^1$ represents a hydrogen atom or a methyl group. From the viewpoint of being easy to appropriately decrease the viscosity of the model material color composition to improve the jettability of the composition, the (meth)acrylamide is preferably monofunctional.

Examples of the monofunctional compounds represented by Formula (3) or Formula (4) include (meth)acrylamides wherein $Q^1$ in Formula (3) is preferably a linear or branched alkyl group having 1 to 10 carbon atoms, and $Q^2$ is preferably a linear or branched alkyl group having 1 to 10 carbon atoms and/or a hydrogen atom [e.g., N,N-dimethylacrylamide, N,N-diethylacrylamide, and N-isopropylacrylamide], hydroxyalkyl(meth)acrylamides wherein $Q^1$ in Formula (3) preferably has a linear or branched hydroxyalkyl group having 2 to 10 carbon atoms, and $Q^2$ is a hydrogen atom [e.g., hydroxyethylacrylamide and hydroxypropylacrylamide], (meth)acrylamides wherein $Q^1$ in Formula (3) preferably has an alicyclic group having 3 to 20 carbon atoms and $Q^2$ is preferably a linear or branched alkyl group having 1 to 10 carbon atoms and/or a hydrogen atom, and (meth)acrylamides wherein $Q^3$ in Formula (4) preferably has 4 to 20 carbon atoms and constitutes an alicyclic group [e.g., acryloylmorpholine].

The N-vinyllactams may be either monofunctional or polyfunctional, and examples thereof include compounds represented by the following Formula (5):

[Chem. 3]

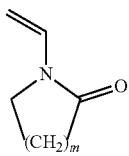

(5)

wherein m represents an integer of 1 to 5. From the viewpoint of being easy to obtain raw materials, m is preferably an integer of 2 to 4, and more preferably 2 or 4. Examples of such N-vinyllactams include specifically N-vinylpyrrolidone and N-vinylcaprolactam.

From the viewpoint of being easy to enhance the strength and hardness of a resulting model material, the model material color composition preferably comprises, as the nitrogen atom-containing ethylenically unsaturated monomer (D2), at least one selected from the group consisting of (meth)acrylamides and N-vinyllactams, more preferably comprises a (meth)acrylamide, and even more preferably comprises a (meth)acrylamide in which $Q^3$ in Formula (4) has 4 to 20 carbon atoms and constitutes an alicyclic group, and particularly preferably comprises acryloylmorpholine.

The content of the nitrogen atom-containing ethylenically unsaturated monomer (D2) contained in the model material color composition is preferably 10% by mass or more, more preferably 15% by mass or more, and even more preferably 20% by mass or more, and is preferably 50% by mass or less, more preferably 45% by mass or less, and even more preferably 40% by mass or less based on the total mass of the model material color composition. When the content of the nitrogen atom-containing ethylenically unsaturated monomer (D2) is equal to or more than the above-mentioned lower limit, it is easy to impart a high strength and hardness to a resulting model material, and the dimensional stability of the model material tends to be improved. When the content of the nitrogen atom-containing ethylenically unsaturated monomer (D2) is equal to or less than the above-mentioned upper limit, the viscosity of the model material color composition is easily controlled, and a good jettability through a nozzle is easily secured.

The model material color composition contained in the composition set for material-jet optical shaping of the present invention preferably comprises, as the ethylenically unsaturated monomer (D), a monofunctional ethylenically unsaturated monomer and a di- or more functional ethylenically unsaturated monomer. Examples of the monofunctional ethylenically unsaturated monomer include the monofunctional (meth)acrylates and the monofunctional nitrogen atom-containing ethylenically unsaturated monomers mentioned above. Examples of the di- or more functional ethylenically unsaturated monomers include the polyfunctional (meth)acrylates and the polyfunctional nitrogen atom-containing ethylenically unsaturated monomers mentioned above. When the model material color composition contained in the composition set for material-jet optical shaping of the present invention comprises a di- or more functional ethylenically unsaturated monomer in addition to the monofunctional ethylenically unsaturated monomer, a resulting model material tends to have an improved toughness and strength.

The content of the monofunctional ethylenically unsaturated monomer in the model material color composition is preferably 30% by mass or more, more preferably 35% by mass or more, and even more preferably 40% by mass or more, and is preferably 70% by mass or less, and more preferably 65% by mass or less based on the total mass of the model material color composition. When the content of the monofunctional ethylenically unsaturated monomer in the model material color composition is equal to or more than the above-mentioned lower limit, it is easy to reduce the viscosity of the model material color composition and enhance the jettability. When the content of the monofunctional ethylenically unsaturated monomer is equal to or less than the above-mentioned upper limit, a resulting model material tends to have an enhanced strength and hardness, and the stickiness of a surface of the model material tends to be suppressed.

The content of the di- or more functional ethylenically unsaturated monomer in the model material color composition is preferably 5% by mass or more, more preferably 8% by mass or more, and even more preferably 10% by mass or more, and is preferably 50% by mass or less, more preferably 40% by mass or less, and even more preferably 35% by mass or less based on the total mass of the model material color composition. When the content of the di- or more functional ethylenically unsaturated monomer in the model material color composition is equal to or more than the above-mentioned lower limit, a resulting model material tends to have an improved toughness, and well-balanced mechanical characteristics tend to be imparted to the model material. When the content of the di- or more ethylenically unsaturated monomer is equal to or less than the above-mentioned upper limit, curing shrinkage during photocuring of the model material color composition tends to be suppressed, and a resulting model material tends to have an improved dimensional accuracy (or warpage prevention property).

In one preferred embodiment of the present invention, the model material color composition preferably comprises the above-mentioned monofunctional (meth)acrylate having an aliphatic cyclic structure, the polyfunctional (meth)acrylate, and the monofunctional nitrogen atom-containing ethylenically unsaturated monomer. When a model material color composition comprises a monofunctional (meth)acrylate having an aliphatic cyclic structure and a polyfunctional (meth)acrylate, it is easy to reduce the viscosity of the composition and enhance the jettability, and at the same time, a resulting model material tends to have an improved toughness, and it is easy to impart well-balanced mechanical characteristics to the model material. Furthermore, when the model material color composition comprises a monofunctional nitrogen atom-containing ethylenically unsaturated monomer, a resulting model material tends to have an improved strength.

In this embodiment, from the viewpoint of being easy to obtain the above-described effects, the content of the monofunctional (meth)acrylate having an aliphatic cyclic structure in the model material color composition is preferably 5% by mass or more, and more preferably 10% by mass or more, and is preferably 75% by mass or less, and more preferably 60% by mass or less based on the total mass of the model material color composition. The content of the polyfunctional (meth)acrylate is preferably 5% by mass or more, and more preferably 10% by mass or more, and is preferably 50% by mass or less, and more preferably 45% by mass or less, based on the total mass of the model material color composition. Furthermore, the content of the monofunctional nitrogen atom-containing ethylenically unsaturated monomer is preferably 5% by mass or more, and more preferably 10% by mass or more, and is preferably 50% by mass or less, and more preferably 40% by mass or less.

The model material color composition contained in the composition set for material-jet optical shaping of the present invention preferably further comprises a polymerizable oligomer. When the model material color composition contains a polymerizable oligomer, the toughness of a model material tends to be improved, and a well-balanced mechanical strength can be secured, so that a model material that is hardly broken even when bent is obtained. In addition, it becomes easy to reduce the tackiness of the surface of the model material.

Examples of the polymerizable oligomer include an epoxy (meth)acrylate oligomer, a polyester (meth)acrylate oligomer, and a urethane (meth)acrylate oligomer. These may be used singly or two or more thereof may be used in combination. From the viewpoint of being capable of imparting strength and toughness to a resulting model material, offering a wide range of material selection, and allowing selection of a material having various characteristics, the polymerizable oligomer to be suitably used is preferably a polymerizable oligomer having a urethane group, and more preferably a urethane (meth)acrylate oligomer.

From the viewpoint of being easy to design the model material color composition to have a low viscosity, being easy to enhance the hardness and strength of a resulting model material, and being easy to reduce the cure shrinkage, the polymerizable oligomer having a urethane group is preferably a caprolactone-modified polymerizable oligomer. When the model material color composition comprises a polymerizable oligomer, the polymerizable oligomer is preferably a caprolactone-modified, isophorone diisocyanate-based polymerizable oligomer from the viewpoint of being easy to enhance the hardness and strength of a resulting model material.

When the model material color composition contains a polymerizable oligomer, the content thereof is preferably 10% by mass or more, and more preferably 15% by mass or more, and i preferably 45% by mass or less, and more preferably 30% by mass or less based on the total mass of the model material color composition. When the content of the polymerizable oligomer is equal to or more than the above-mentioned lower limit, the tackiness of a surface of a model material is easily sufficiently reduced. When the content of the polymerizable oligomer is equal to or less than the above-mentioned upper limit, a good jettability of the model material color composition is easily secured.

The model material color composition may comprise, as necessary, other additives unless the effects of the present invention are impaired. Examples of the other additives include photopolymerization initiators, surface adjusting agents, preservation stabilizers, antioxidants, coloring agents, ultraviolet absorbing agents, light stabilizers, polymerization inhibitors, chain transfer agents, and fillers. These components are not particularly limited, and known compounds conventionally used in the art can be appropriately selected and used. As the photopolymerization initiator and the preservation stabilizer, the same photopolymerization initiator and preservation stabilizer as those described above as examples of the photopolymerization initiator and the preservation stabilizer that can be contained in the model material clear composition can be suitably used also in the model material color composition in the same amounts. The additive contained in the model material clear composition and the additive contained in the model material color composition may be the same or different from each other.

Examples of the surface adjusting agent that can be contained in the model material color composition include the same agents as those described above as examples of the surface adjusting agent that can be contained in the model material clear composition. When the model material color composition comprises a surface adjusting agent, the content thereof is preferably 0.005% by mass or more, more preferably 0.01% by mass or more, and even more preferably 0.05% by mass or more, and is preferably 2% by mass or less, more preferably 1.5% by mass or less, and even more preferably 1% by mass or less based on the total mass of the model material color composition. When the content of the surface adjusting agent is within the above range, the surface tension of the model material color composition is easily controlled to an appropriate range.

Each of the model material clear composition and the model material color composition constituting the composition set for material-jet optical shaping of the present invention preferably comprises a surface adjusting agent. In this case, the amount of the surface adjusting agent contained in the model material color composition (i.e., the content (% by mass) of the surface adjusting agent based on the total mass of the model material color composition) is preferably smaller than the amount of the surface adjusting agent contained in the model material clear composition (the content (% by mass) of the surface adjusting agent based on the total mass of the model material clear composition). When the amount of the surface adjusting agent contained in the model material color composition is smaller than the amount of the surface adjusting agent contained in the model material clear composition, repelling between the model material clear composition and the model material color composition at the interface between the compositions is suppressed. As a result, a clear boundary between the clear model material and the color model material is formed in a resulting model material, so that a model material superior in appearance can be obtained. In this case, the amount of the surface adjusting agent contained in the model material color composition may be appropriately determined according to the types and proportions of the polymerizable compounds constituting the model material color composition and the model material clear composition. In one embodiment of the present invention, the amount (% by mass) of the surface adjusting agent contained in the model material color composition is preferably 30% or more, more preferably 35% or more, and even more preferably 40% or more, and is preferably 85% or less, more preferably 70% or less, and even more preferably 60% or less based on the amount (% by mass) of the surface adjusting agent contained in the model material clear composition of the present invention.

The model material color composition in the composition set for material-jet optical shaping of the present invention is usually a colored composition containing a pigment. Although the constitution of the model material color composition is not particularly limited, the constitution preferably contains cyan, magenta and yellow, and more preferably further contains white and/or black.

From the viewpoint of color tone and color development as well as ease of pigment dispersion, cyan preferably contains at least one pigment selected from the group consisting of C.I. Pigment Blue 15:3 and C.I. Pigment Blue 15:4.

From the viewpoint of color tone and color development as well as ease of pigment dispersion, magenta preferably contains at least one pigment selected from the group consisting of C.I. Pigment Red 122, C.I. Pigment Red 202, and C.I. Pigment Violet 19.

From the viewpoint of color tone and color development as well as ease of pigment dispersion, yellow preferably contains at least one pigment selected from the group consisting of C.I. Pigment Yellow 150 and C.I. Pigment Yellow 155.

From the viewpoint of color tone and concealability as well as ease of pigment dispersion, white preferably contains titanium oxide. From the viewpoint of being easy to improve the light stability of the ink, titanium oxide is more preferably rutile type titanium oxide.

From the viewpoint of color tone and color development as well as ease of pigment dispersion, black preferably contains carbon black.

The content of the pigment in the model material color composition may be appropriately set according to the desired color tone of the model material color composition and the type of the pigment to be used, but is usually 0.1% by mass or more, and more preferably 0.2% by mass or more based on the total mass of the model material color composition. The upper limit of the content of the pigment in the model material color composition also is not particularly limited, and it is usually 5.0% by mass or less, and preferably 3.0% by mass or less based on the total amount of the model material color composition.

The viscosity of the model material color composition is preferably 1 mPa·s or more and less than 500 mPa·s at 25° C. for use in a material-jet optical shaping process. The viscosity at 25° C. is preferably from 10 to 400 mPa·s, more preferably from 20 to 300 mPa s, and even more preferably from 25 to 100 mPa·s from the viewpoint of improving jettability from a material jetting nozzle. The viscosity can be measured using a R100 type viscometer in accordance with JIS Z 8803. The viscosity of the model material color composition can be controlled by adjusting the type and blending ratio of a polymerizable compound, and the type and addition amount of a dilution solvent and a thickener.

The surface tension of the model material color composition of the present invention is preferably from 24 to 34 mN/m, and more preferably from 28 to 30 mN/m. When the surface tension is within the above range, the droplet jetted through a nozzle can be normally formed even at the time of high-speed jetting in material jet, an appropriate droplet amount is easily secured, and it becomes easy to improve the shaping accuracy. In the present invention, the surface tension of the model material color composition can be controlled by adjusting the type and blending amount of the surface adjusting agent.

In the present invention, the method for producing the model material color composition is not particularly limited, and for example, the model material color composition can be produced by uniformly mixing components constituting the model material color composition using a mixing and stirring device.

[Support Material Composition]

In order to form a complicated shape or a minute shape with a high accuracy, the model material clear composition of the present invention is preferably used in combination with a support material for supporting the model material during three-dimensional shaping. Accordingly, the present invention is also directed to a composition set for material-jet optical shaping comprising the model material clear composition of the present invention and a support material composition for shaping a support material by a material-jet optical shaping process.

The support material composition is a photocurable resin composition for a support material which affords a support material by photocuring. After the model material is fabricated, the support material can be removed from the model material by physical peeling or dissolving the support material in an organic solvent or water. The model material clear composition and the composition set for material-jet optical shaping of the present invention can be used in combination with various compositions conventionally known as support material compositions. The support material composition constituting the composition set for optical shaping of the present invention is preferably soluble in water because the model material is not damaged when the support material is removed, the support material is environmentally friendly, and the support material can be removed cleanly and easily even in a fine part.

Examples of such a water-soluble support material composition include those containing a monofunctional ethylenically unsaturated monomer and a polyalkylene glycol having at least one group selected from the group consisting of an oxyethylene group and an oxypropylene group.

The monofunctional ethylenically unsaturated monomer contained in the support material composition is a polymerizable monomer having one ethylenic double bond in the molecule and having a property of being cured by energy rays, and is preferably a water-soluble monofunctional ethylenically unsaturated monomer. Examples of the monofunctional ethylenically unsaturated monomer contained in the support material composition include hydroxy group-containing (meth)acrylates having 2 to 15 carbon atoms [e.g., hydroxyethyl (meth)acrylate, hydroxypropyl (meth) acrylate, and 4-hydroxybutyl (meth)acrylate], hydroxy group-containing (meth)acrylates having a number average molecular weight (Mn) of 200 to 1,000 [e.g., polyethylene glycol mono(meth)acrylate, monoalkoxy(1 to 4 carbon atoms)polyethylene glycol mono(meth)acrylate, polypropylene glycol mono(meth)acrylate, monoalkoxy(1 to 4 carbon atoms)polypropylene glycol mono(meth)acrylate, and mono(meth)acrylate of PEG-PPG block polymer], (meth) acrylamide derivatives having 3 to 15 carbon atoms [e.g., (meth)acrylamide, N-methyl(meth)acrylamide, N-ethyl (meth)acrylamide, N-propyl(meth)acrylamide, N-butyl (meth)acrylamide, N,N'-dimethyl(meth)acrylamide, N,N'-diethyl(meth)acrylamide, N-hydroxyethyl(meth)acrylamide, N-hydroxypropyl(meth)acrylamide, and N-hydroxybutyl(meth)acrylamide], and (meth)acryloylmorpholine. These may be used singly or two or more thereof may be used in combination.

From the viewpoint of improving the curability of the support material composition, and easily and rapidly dissolving in water the support material obtained by photocuring the support material composition, the content of the monofunctional ethylenically unsaturated monomer contained in the support material composition is preferably 20% by mass or more, and more preferably 25% by mass or more based on the total amount of the support material composition. The content is preferably 50% by mass or less, and more preferably 45% by mass or less.

The support material composition preferably comprises a polyalkylene glycol containing at least one group selected from the group consisting of an oxyethylene group and an oxypropylene group. The polyalkylene glycol containing at least one group selected from the group consisting of an oxyethylene group and an oxypropylene group is one in which at least one selected from the group consisting of ethylene oxide and propylene oxide has been added to an active hydrogen compound. Examples of the polyalkylene glycol include polyethylene glycol and polypropylene glycol. These may be used singly or two or more thereof may be used in combination. Examples of the active hydrogen compound include monohydric to tetrahydric alcohols and amine compounds. Among them, a dihydric alcohol or water is preferable.

From the viewpoint of being easy to enhance the solubility in water of the support material obtained by photocuring the support material composition, the content of the polyalkylene glycol in the support material composition is preferably 20% by mass or more, and more preferably 25% by mass or more based on the total amount of the support material composition. In addition, from the viewpoint of preventing the phenomenon that the polyalkylene glycol leaks out of the support material during molding a three-dimensionally shaped article and easily enhancing the preciseness of molding, the content is preferably 49% by mass or less, and more preferably 45% by mass or less.

The number average molecular weight (Mn) of the polyalkylene glycol is preferably from 100 to 5,000. When the (Mn) of the polyalkylene glycol is within the above-mentioned range, it is compatibilized with the polyalkylene glycol before photocuring and is difficult to be compatibilized with the polyalkylene glycol after photocuring. As a result, the self-standing of the support material obtained by photocuring the support material composition can be enhanced, and the solubility in water of the support material can be enhanced. The (Mn) of the polyalkylene glycol is preferably from 200 to 3,000, and more preferably from 400 to 2,000.

The support material composition may contain other additives, if necessary. Examples of the other additives include photopolymerization initiators, water-soluble organic solvents, antioxidants, coloring agents, pigment dispersants, preservation stabilizers, ultraviolet absorbing agents, light stabilizers, polymerization inhibitors, chain transfer agents, and fillers.

As the photopolymerization initiator, the compounds described above as examples of the photopolymerization initiator that may be contained in the model material clear composition can be similarly used. When the support material composition contains a photopolymerization initiator, the content thereof is preferably 2% by mass or more, and more preferably 3% by mass or more, and is preferably 20% by mass or less, and more preferably 10% by mass or less, based on the total amount of the support material composition. When the content of the photopolymerization initiator is within the above-mentioned range, it is easy to reduce unreacted polymerizable components and sufficiently enhance the curability of the support material.

The water-soluble organic solvent is a component that improves the solubility in water of the support material obtained by photocuring the support material composition. Moreover, it is also a component that can adjust the support material composition to have a low viscosity. When the support material composition contains a water-soluble organic solvent, the content of the water-soluble organic solvent is preferably 35% by mass or less, and more preferably 30% by mass or less based on the total amount of the support material composition. The content is preferably 3% by mass or more, more preferably 5% by mass or more, and even more preferably 10% by mass or more. When the amount of the water-soluble organic solvent in the support material composition is excessively large, effusion of the water-soluble organic solvent occurs when the support material composition is photocured, so that the dimensional accuracy of the model material formed on the upper layer of the support material may deteriorate. When the content of the water-soluble organic solvent is equal to or less than the above-mentioned upper limit, it is easy to suppress such effusion. In addition, when the content of the water-soluble organic solvent in the support material composition is equal to or more than the above-mentioned lower limit, it is easy to improve the removability of the support material by water and it is also easy to control the support material composition to have a low viscosity.

Examples of the water-soluble organic solvent include alkylene glycol monoacetates having a linear or branched alkylene group [e.g., ethylene glycol monoacetate, propylene glycol monoacetate, diethylene glycol monoacetate, dipropylene glycol monoacetate, triethylene glycol monoacetate, tripropylene glycol monoacetate, tetraethylene glycol monoacetate, and tetrapropylene glycol monoacetatel, alkylene glycol monoalkyl ethers having a linear or branched alkylene group [e.g., ethylene glycol monomethyl ether, propylene glycol monomethyl ether, diethylene glycol monomethyl ether, dipropylene glycol monomethyl ether, triethylene glycol monomethyl ether, tripropylene glycol monomethyl ether, tetraethylene glycol monomethyl ether, tetrapropylene glycol monomethyl ether, ethylene glycol monoethyl ether, propylene glycol monoethyl ether, diethylene glycol monoethyl ether, dipropylene glycol monoethyl ether, triethylene glycol monoethyl ether, tripropylene glycol monoethyl ether, tetraethylene glycol monoethyl ether, tetrapropylene glycol monoethyl ether, ethylene glycol monopropyl ether, propylene glycol monopropyl ether, diethylene glycol monopropyl ether, dipropylene glycol monopropyl ether, triethylene glycol monopropyl ether, tripropylene glycol monopropyl ether, tetraethylene glycol monopropyl ether, tetrapropylene glycol monopropyl ether, ethylene glycol monobutyl ether, propylene glycol monobutyl ether, diethylene glycol monobutyl ether, dipropylene glycol monobutyl ether, triethylene glycol monobutyl ether, tripropylene glycol monobutyl ether, tetraethylene glycol monobutyl ether, and tetrapropylene glycol monobutyl ether], alkylene glycol diacetates having a linear or branched alkylene group [e.g., ethylene glycol diacetate, propylene glycol diacetate, diethylene glycol diacetate, dipropylene glycol diacetate, triethylene glycol diacetate, tripropylene glycol diacetate, tetraethylene glycol diacetate, and tetrapropylene glycol diacetate], alkylene glycol dialkyl ethers having a linear or branched alkylene group [e.g., ethylene glycol dimethyl ether, propylene glycol dimethyl ether, diethylene glycol dimethyl ether, dipropylene glycol dimethyl ether, triethylene glycol dimethyl ether, tripropylene glycol dimethyl ether, tetraethylene glycol dimethyl ether, tetrapropylene glycol dimethyl ether, ethylene glycol diethyl ether, propylene glycol diethyl ether, diethylene glycol diethyl ether, dipropylene glycol diethyl ether, triethylene glycol diethyl ether, tripropylene glycol diethyl ether, tetraethylene glycol diethyl ether, tetrapropylene glycol diethyl ether, ethylene glycol dipropyl ether, propylene glycol dipropyl ether, diethylene glycol dipropyl ether, dipropylene glycol dipropyl ether, triethylene glycol dipropyl ether, tripropylene glycol dipropyl ether, tetraethylene glycol dipropyl ether, tetrapropylene glycol dipropyl ether, ethylene glycol dibutyl ether, propylene glycol dibutyl ether, diethylene glycol dibutyl ether, dipropylene glycol dibutyl ether, triethylene glycol dibutyl ether, tripropylene glycol dibutyl ether, tetraethylene glycol dibutyl ether, and tetrapropylene glycol dibutyl ether], alkylene glycol monoalkyl ether acetates having a linear or branched alkylene group [e.g., ethylene glycol monomethyl ether acetate, propylene glycol monomethyl ether acetate, diethylene glycol monomethyl ether acetate, dipropylene glycol monomethyl ether acetate, triethylene glycol monomethyl ether acetate, tripropylene glycol monomethyl ether acetate, tetraethylene glycol monomethyl ether acetate, tetrapropylene glycol monomethyl ether acetate, ethylene glycol monoethyl ether acetate, propylene glycol monoethyl ether acetate, diethylene glycol monoethyl ether acetate, dipropylene glycol monoethyl ether acetate, triethylene glycol monoethyl ether acetate, tripropylene glycol monoethyl ether acetate, tetraethylene glycol monoethyl ether acetate, tetrapropylene glycol monoethyl ether acetate, ethylene glycol monopropyl ether acetate, propylene glycol monopropyl ether acetate, diethylene glycol monopropyl ether acetate, dipropylene glycol monopropyl ether acetate, triethylene glycol monopropyl ether acetate, tripropylene glycol monopropyl ether acetate, tetraethylene glycol monopropyl ether acetate, tetrapropylene glycol monopropyl ether acetate, ethylene glycol monobutyl ether acetate, propylene glycol monobutyl ether acetate, diethylene glycol monobutyl ether acetate, dipropylene glycol monobutyl ether acetate, triethylene glycol monobutyl ether acetate, tripropylene glycol monobutyl ether acetate, tetraethylene glycol monobutyl ether acetate, and tetrapropylene glycol monobutyl ether acetate]. These may be used singly or two or more thereof may be used in combination. Among them, the water-soluble organic solvent is more preferably triethylene glycol monomethyl ether or dipropylene glycol monomethyl ether acetate from the viewpoint of being easy to improve the removability of the support material by water and easy to control the support material composition to have a low viscosity.

The viscosity of the support material composition in the present invention is preferably from 1 to 500 mPa·s, more preferably from 10 to 400 mPa·s, and even more preferably from 25 to 100 mPa·s at 25° C. from the viewpoint of improving jettability from a material jetting nozzle. The viscosity can be measured using a R100 type viscometer in accordance with JIS Z8803.

In the present invention, the method for producing the support material composition is not particularly limited, and for example, the support material composition can be produced by uniformly mixing components constituting the support material composition using a mixing and stirring device.

<Method for Fabricating Optically Shaped Article>

Using the model material clear composition or the composition set for material-jet optical shaping of the present invention, a three-dimensionally shaped article (a model material or an optically shaped article) can be fabricated by a optical shaping process by a material-jet system.

The method for fabricating an optically shaped article is not particularly limited as long as it is a method of fabricating a three-dimensionally shaped article by a optical shaping process by a material-jet system using the model material clear composition or the composition set for optical shaping of the present invention, and a known method can be employed. A model material, which is a three-dimensionally shaped article, can be obtained, for example, by a method comprising a step of photocuring the model material clear composition to obtain a model material and photocuring the support material composition to obtain a support material, and a step of removing the support material from the model material.

In the fabrication method, for example, the optically shaped article may be fabricated as follows: based on three-dimensional CAD data of an article to be fabricated, data of a model material clear composition that is laminated by a material-jet method to constitute a three-dimensionally shaped article and data of a support material composition that supports the three-dimensionally shaped article under fabrication are prepared, then slice data for jetting each composition with a material-jet 3D printer is further prepared, and after each of the composition for a model material and the composition for a support material is jetted based on the prepared slice data, photocuring treatment is repeated for each layer, and thus an optically shaped article composed of a cured product of the model material clear composition (a model material) and a cured product of the support material composition (a support material) can be fabricated.

Examples of the light that cures the model material clear composition and the support material composition include active energy rays such as far infrared rays, infrared rays, visible rays, near ultraviolet rays, ultraviolet rays, electron beams, α-rays, γ-rays, and X-rays. Among these, near ultraviolet rays or ultraviolet rays are preferable from the viewpoint of easiness and efficiency of curing work.

Examples of a light source include conventionally publicly-known high-pressure mercury lamps, metal halide lamps, and UV-LEDs. Among these, an LED system is preferable from the viewpoint of being capable of reducing the size of facility and requiring small power consumption. The light quantity is preferably from 200 to 1000 $mJ/cm^2$ from the viewpoint of the hardness and dimensional accuracy of a model material. When a UV-LED is used as a light source, it is preferable to use a light source having a center wavelength of 385 to 415 nm because light easily reaches a deep layer and the hardness and dimensional accuracy of a resulting model material can be improved.

The thickness of each layer constituting the three-dimensionally shaped article is preferably thinner from the viewpoint of shaping accuracy, but is preferably from 5 to 30 μm from the balance with the shaping speed.

The resulting three-dimensionally shaped article is a combination of the model material and the support material. By removing the support material from the three-dimensionally shaped article, a three-dimensionally shaped article, which is the model material, can be obtained. The removal of the support material is preferably performed as follows: for example, the resulting three-dimensionally shaped article is immersed in a removal solvent capable of dissolving the support material, thereby softening the support material, and then the support material is removed with a brush or the like from the surface of the model material. As the solvent for removing the support material, water, a water-soluble solvent such as a glycol-based solvent or an alcohol-based solvent may be used. These may be used singly or two or more thereof may be used in combination.

[Photocured Product]

A photocured product of the model material clear composition of the present invention exhibits a highly transparent and crystal-like color tone with a reduced yellowness. In a photocured product of the model material clear composition of the present invention, at a thickness of 2 mm, the $L^*$ value of the Lab color system is 90 or more, preferably 95 or more, the $a^*$ value is −2 or more and less than 2, preferably −1 or more and less than 1, and the $b^*$ value is −10 or more and less than 4, preferably −5 or more and less than 2, more preferably −2 or more and less than 1. Herein, $L^*$ denotes brightness and the value range of $L^*$ is from 0 to 100, where 0 denotes black and 100 denotes white; $a^*$ represents a range from red to green, $b^*$ represents a range from blue to yellow, and the ranges of $a^*$ and $b^*$ are both from +60 to −60, where +60$a^*$ is red and gradually transitions to −60$a^*$, which is green; similarly, +60$b^*$ is yellow and −60$b^*$ is blue. The value of the Lab color difference can be measured using a spectrophotometer, for example, "CM-5" (trade name) manufactured by Konica Minolta, Inc.

The photocured product of the model material clear composition of the present invention is highly transparent. The transparency of a photocured product of the model material clear composition can be evaluated by measuring the total light transmittance using a haze meter, for example, "NDH 2000" (trade name) manufactured by Nippon Denshoku Industries Co., Ltd. The total light transmittance of a photocured product of the model material clear composition of the present invention is 80 or more, preferably 85 or more, at a thickness of 2 mm.

EXAMPLES

Hereinafter, the present invention will be described in more detail by way of Examples. In Examples, "%" is "% by mass" unless otherwise specified.

[(1) Model Material Clear Composition]

(1-1. Preparation of Model Material Clear Composition)

The details of the components constituting the model material clear compositions used in Examples and Comparative Examples are shown in Table 1.

TABLE 1

| | | | Abbreviation | Name of component | Specification |
|---|---|---|---|---|---|
| Polymerizable compound | Ethylenically unsaturated compound (A) | Ethylenically unsaturated monomer (A1) | FA-511AS | Dicyclopentenyl acrylate | FANCRYL FA-511AS manufactured by Showa Denko Materials Co., Ltd. (ethylenic double bond(s)/molecule: 1 bond) |
| | | | FA-512AS | Dicyclopentenyloxyethyl acrylate | FANCRYL FA-512AS manufactured by Showa Denko Materials Co., Ltd. (ethylenic double bond(s)/molecule: 1 bond) |
| | | | FA-512M | Dicyclopentenyloxyethyl methacrylate | FANCRYL FA-512M manufactured by Showa Denko Materials Co., Ltd. (ethylenic double bond(s)/molecule: 1 bond) |
| | | | FA-513AS | Dicyclopentanyl acrylate | FANCRYL FA-513AS manufactured by Showa Denko Materials Co., Ltd. (ethylenic double bond(s)/molecule: 1 bond) |
| | | Ethylenically unsaturated compound (A2) | CN-981 | Urethane-based polymerizable oligomer component having isophorone structure | SARTOMER CN-981 manufactured by Arkema S.A. (ethylenic double bond(s)/molecule: 2 bonds) |
| | | | CN-991 | Urethane-based polymerizable oligomer component having dicyclohexylmethane structure | SARTOMER CN-991 manufactured by Arkema S.A. (ethylenic double bond(s)/molecule: 2 bonds) |
| | | | Ebe8402 | Urethane-based polymerizable oligomer component having dicyclohexylmethane structure | Ebecryl 8402 manufactured by Daicel-Allnex Ltd. (ethylenic double bond(s)/molecule: 2 bonds) |
| | | Ethylenically unsaturated monomer (A3) | IBOA | Isobornyl acrylate | SARTOMER SR506D manufactured by Arkema S.A. (ethylenic double bond(s)/molecule: 1 bond) |
| | | | TMCHA | 3,5,5-Trimethylcyclohexyl acrylate | SARTOMER SR420 manufactured by Arkema S.A. (ethylenic double bond(s)/molecule: 1 bond) |
| | | | ACMO | Acryloylmorpholine | Acryloylmorpholine manufactured by KJ Chemicals Corporation (ethylenic double bond(s)/molecule: 1 bond) |
| | | | TPGDA | Tripropylene glycol diacrylate | SARTOMER SR306 manufactured by Arkema S.A. (acrylic group(s)/molecule: 2 groups) |

TABLE 1-continued

| | | Abbreviation | Name of component | Specification |
|---|---|---|---|---|
| Photopolymerization initiator | Acylphosphine oxide-based | Omnirad TPO | 2,4,6-Trimethylbenzoyl-diphenyl-phosphine oxide | Omnirad TPO manufactured by IGM RESINS B.V. |
| | α-Hydroxyacetophenone-based | Omnirad 184 | 1-Hydroxycyclohexyl-phenyl-ketone | Omnirad 184 manufactured by IGM RESINS B.V. |
| Polymerization inhibitor | Hindered amine-based | HYDROXY-TEMPO | 4-Hydroxy-2,2,6,6-tetramethylpiperidine-N-oxyl | H-TEMPO manufactured by Evonik Degussa Japan Co., Ltd. |
| Antioxidant | Phenolic | MEHQ | 4-Methoxyphenol | Hydroquinone monomethyl ether manufactured by Tokyo Chemical Industry Co., Ltd. |
| | | BHT | 2,6-Di-t-butyl-p-cresol | Butylhydroxytoluene manufactured by Tokyo Chemical Industry Co., Ltd. |
| Surface adjusting agent | Silicone-based | BYK-UV3500 | Silicone-based surface adjusting agent having polydimethylsiloxane structure | BYK-UV3500 manufactured by BYK-Chemie GmbH |
| Color material | Organic dye | Quinizarin Blue | 1-Hydroxy-4-toluidinoanthraquinone | Quinizarin Blue manufactured by Tokyo Chemical Industry Co., Ltd. |

According to each composition shown in the following Tables 2 to 4, the components constituting each model material clear composition were uniformly mixed and stirred using a mixing and stirring device to prepare each model material clear composition of Examples 1 to 22 and Comparative Examples 1 to 4.

TABLE 2

| | | | Abbreviation | Example 1 | Example 2 | Example 3 | Example 4 | Example 5 | Example 6 | Example 7 | Example 8 | Example 9 |
|---|---|---|---|---|---|---|---|---|---|---|---|---|
| Polymerizable compound | Ethylenically unsaturated compound (A) | Ethylenically unsaturated monomer (A1) | FA-511AS | 50.0 | | | | | | | | |
| | | | FA-512AS | | 50.0 | | | 50.0 | 50.0 | 50.0 | | 50.0 |
| | | | FA-512M | | | | 50.0 | | | | | |
| | | | FA-513AS | | | | | 50.0 | | | 50.0 | |
| | | Ethylenically unsaturated compound (A2) | CN-981 | | | | | | | | 22.0 | |
| | | | CN-991 | | | | | 22.0 | 22.0 | 20.0 | | |
| | | | Ebe8402 | 22.0 | 22.0 | 22.0 | 22.0 | | | | | 22.0 |
| | | Ethylenically unsaturated monomer (A3) | IBOA | 24.7 | 24.7 | 24.7 | 24.7 | | 14.7 | | | |
| | | | TMCHA | | | | | 24.7 | | | 24.7 | 24.7 |
| | | | ACMO | | | | | | | 10.0 | | |
| | | | TPGDA | | | | | | | 26.7 | | |
| Photo-polymerization initiator | Acylphosphine oxide-based | | Omnirad TPO | 3.0 | 3.0 | 3.0 | 3.0 | 3.0 | 3.0 | 3.0 | 3.0 | |
| | Acetophenone-based | | Omnirad 184 | | | | | | | | | 3.0 |
| Polymerization inhibitor | HALS-based | | HYDROXY-TEMPO | 0.1 | 0.1 | 0.1 | 0.1 | 0.1 | 0.1 | 0.1 | 0.1 | 0.1 |
| Antioxidant | Phenolic | | MEHQ | | | | | | | | | |
| | | | BHT | 0.01 | 0.01 | 0.01 | 0.01 | 0.01 | 0.01 | 0.01 | 0.01 | 0.01 |
| Surface adjusting agent | Silicone-based | | BYK-UV3500 | 0.2 | 0.2 | 0.2 | 0.2 | 0.2 | 0.2 | 0.2 | 0.2 | 0.2 |
| Total | | | | 100 | 100 | 100 | 100 | 100 | 100 | 100 | 100 | 100 |
| Value of Formula (2) | | | | 122 | 122 | 122 | 122 | 122 | 122 | 122 | 122 | 122 |
| Amount (%) of ethylenically unsaturated compound (A) | | | | 96.7 | 96.7 | 96.7 | 96.7 | 96.7 | 96.7 | 96.7 | 96.7 | 96.7 |
| Amount (%) of ethylenically unsaturated monomer (A1) in unsaturated compound (A) | | | | 51.7 | 51.7 | 51.7 | 51.7 | 51.7 | 51.7 | 51.7 | 51.7 | 51.7 |
| Amount (%) of ethylenically unsaturated compound (A2) in unsaturated compound (A) | | | | 22.8 | 22.8 | 22.8 | 22.8 | 22.8 | 22.8 | 20.7 | 22.8 | 22.8 |

TABLE 3

| | | | Abbreviation | Example 10 | Example 11 | Example 12 | Example 13 | Example 14 | Example 15 | Example 16 | Example 17 | Example 18 |
|---|---|---|---|---|---|---|---|---|---|---|---|---|
| Polymerizable compound | Ethylenically unsaturated compound (A) | Ethylenically unsaturated monomer (A1) | FA-511AS | | | | | | | | | |
| | | | FA-512AS | 50.0 | 45.0 | 50.0 | 50.0 | 50.0 | 40.0 | 45.0 | 50.0 | 50.0 |
| | | | FA-512M | | | | | | | | | |
| | | | FA-513AS | | | | | | | | | |
| | | Ethylenically unsaturated compound (A2) | CN-981 | | | | | | | | | |
| | | | CN-991 | | | | | | | | | 17.0 |
| | | | Ebe8402 | 22.0 | 17.0 | 17.0 | 17.0 | 22.0 | 17.0 | 17.0 | 22.0 | |
| | | Ethylenically unsaturated monomer (A3) | IBOA | 27.2 | 22.7 | 22.8 | 17.8 | 22.7 | 21.8 | 22.8 | 22.8 | 22.7 |
| | | | TMCHA | | | | | | | | | |
| | | | ACMO | | | | | | | | | |
| | | | TPGDA | | | | | | | | | |
| Photo-polymerization initiator | Acylphosphine oxide-based | | Omnirad TPO | 0.5 | 15.0 | 10.0 | 10.0 | 5.0 | 15.0 | 15.0 | | |
| | Acetophenone-based | | Omnirad 184 | | | | | | | | 5.0 | 10.0 |
| Polymerization inhibitor | HALS-based | | HYDROXY-TEMPO | 0.1 | 0.1 | 0.01 | 5.0 | 0.1 | 3.0 | 0.05 | 0.05 | 0.06 |
| Antioxidant | Phenolic | | MEHQ | 0.01 | | 0.01 | | | 3.0 | | | |
| | | | BHT | | 0.01 | | 0.01 | 0.001 | | 0.001 | 0.001 | 0.001 |
| Surface adjusting agent | Silicone-based | | BYK-UV3500 | 0.2 | 0.2 | 0.2 | 0.2 | 0.2 | 0.2 | 0.2 | 0.2 | 0.2 |
| Total | | | | 100 | 100 | 100 | 100 | 100 | 100 | 100 | 100 | 100 |
| Value of Formula (2) | | | | 50 | 274 | 315 | 6.3 | 223 | 1.3 | 760 | 439 | 520 |
| Amount (%) of ethylenically unsaturated compound (A) | | | | 99.2 | 84.7 | 89.8 | 84.8 | 94.7 | 78.8 | 84.7 | 94.7 | 89.7 |
| Amount (%) of ethylenically unsaturated monomer (A1) in unsaturated compound (A) | | | | 50.4 | 53.1 | 55.7 | 59.0 | 52.8 | 50.8 | 53.1 | 52.8 | 55.7 |
| Amount (%) of ethylenically unsaturated monomer (A2) in unsaturated compound (A) | | | | 22.2 | 20.1 | 18.9 | 20.0 | 23.2 | 21.6 | 20.1 | 23.2 | 18.9 |

TABLE 4

| | | | Abbreviation | Example 19 | Example 20 | Example 21 | Example 22 | Comparative Example 1 | Comparative Example 2 | Comparative Example 3 | Comparative Example 4 |
|---|---|---|---|---|---|---|---|---|---|---|---|
| Polymerizable compound | Ethylenically unsaturated compound (A) | Ethylenically unsaturated monomer (A1) | FA-511AS | | | | | | | | |
| | | | FA-512AS | 50.0 | 50.0 | 50.0 | 74.7 | | 50.0 | 50.0 | 50.0 |
| | | | FA-512M | | | | | | | | |
| | | | FA-513AS | | | | | | | | |
| | | Ethylenically unsaturated compound (A2) | CN-981 | | | | | | | | |
| | | | CN-991 | | | | | | | | |
| | | | Ebe8402 | 22.0 | 22.0 | | 22.0 | 22.0 | 22.0 | 22.0 | 22.0 |
| | | Ethylenically unsaturated monomer (A3) | IBOA | 26.7 | 21.6 | | | 23.0 | 26.7 | 19.8 | 22.8 |
| | | | TMCHA | | | 20.7 | | 30.0 | | | |
| | | | ACMO | | | | | | | | |
| | | | TPGDA | | | 26.0 | | 21.7 | | | |
| Photo-polymerization initiator | Acylphosphine oxide-based | | Omnirad TPO | 1.0 | 5.0 | 3.0 | 3.0 | 3.0 | 0.1 | 5.0 | 5.0 |
| | Acetophenone-based | | Omnirad 184 | | | | | | | | |
| Polymerization inhibitor | HALS-based | | HYDROXY-TEMPO | 0.05 | 1.0 | 0.1 | 0.1 | 0.1 | 1.0 | 0.01 | 0.01 |
| Antioxidant | Phenolic | | MEHQ | | 0.2 | | | | | | |
| | | | BHT | 0.05 | | 0.01 | 0.01 | 0.01 | 0.01 | 3.0 | 0.002 |
| Surface adjusting agent | Silicone-based | | BYK-UV3500 | 0.2 | 0.2 | 0.2 | 0.2 | 0.2 | 0.2 | 0.2 | 0.2 |
| Total | | | | 100 | 100 | 100 | 100 | 100 | 100 | 100 | 100 |

TABLE 4-continued

|  | Abbreviation | Example 19 | Example 20 | Example 21 | Example 22 | Comparative Example 1 | Comparative Example 2 | Comparative Example 3 | Comparative Example 4 |
|---|---|---|---|---|---|---|---|---|---|
| Value of Formula (2) |  | 19.9 | 10.0 | 123 | 123 | 123 | 2.2 | 0.7 | 1000 |
| Amount (%) of ethylenically unsaturated compound (A) |  | 98.7 | 93.6 | 96.7 | 96.7 | 96.7 | 98.7 | 91.8 | 94.8 |
| Amount (%) of ethylenically unsaturated monomer (A1) in unsaturated compound (A) |  | 50.7 | 53.4 | 51.7 | 77.2 | 0 | 50.6 | 54.5 | 52.7 |
| Amount (%) of ethylenically unsaturated compound (A2) in unsaturated compound (A) |  | 22.3 | 23.5 | 0 | 22.8 | 22.8 | 22.3 | 24.0 | 23.2 |

(1-2. Method for Evaluating Model Material Clear Composition)

The viscosity, preservation stability, and curability of each of the model material clear compositions of Examples 1 to 22 and Comparative Examples 1 to 4 were evaluated in accordance with the following methods. The results of the evaluations are shown in Tables 5 to 6.

<1-2-1. Method for Evaluating Viscosity>

The viscosity (unit: mPa·s) of the model material clear composition prepared was measured under the conditions of a temperature of 25° C. and a cone rotation rate of 5 rpm by a method in accordance with JIS Z 8803 using a R100 type viscometer (manufactured by Toki Sangyo Co., Ltd.). The viscosity measured at this time was taken as an initial viscosity, and used for the following evaluation of the viscosity change rate.

<1-2-2. Method for Evaluating Viscosity Change Rate>

The model material clear composition the viscosity of which had been measured was preserved in a sealed glass bottle at 60° C. for 30 days, and the viscosity of the composition after the preservation was measured. The viscosity change rate was determined from the viscosities measured before and after the preservation. The viscosity change rate was determined from the following formula.

Viscosity change rate (%)={(viscosity after preservation-initial viscosity)/(initial viscosity)}×100

The measured viscosity change rate was evaluated according to the following evaluation criteria.

[Evaluation Criteria of Viscosity Change Rate]
A, excellent: The viscosity change rate is less than 3%.
B, good: The viscosity change rate is 3% or more and less than 5%.
C, fair: The viscosity change rate is 5% or more and less than 10%.
D, poor: The viscosity change rate is 10% or more.

<1-2-3. Method for Evaluating Curability>

Spacers having the same thickness (1 mm) as that of a test piece were disposed on the four sides of the upper surface of a glass plate (trade name "GLASS PLATE", manufactured by AS ONE Corporation, 200 mm×200 mm×5 mm in thickness), forming molds each having the shape of the test piece (20 mm×20 mm). The model material clear composition prepared was cast into the molds, and then, another sheet of the above-mentioned glass plate was put thereon. Subsequently, ultraviolet rays were applied with a UV-LED having a center wavelength of 385 nm as an irradiation means to the upper and lower surfaces such that the amount of light applied was a prescribed integrated light quantity, and the model material clear composition was thereby cured. Thereafter, the cured product was released from the glass plate, affording test pieces (20 mm×20 mm).

Whether the obtained test pieces were cured at the prescribed integrated light quantities was examined. The measured curability was evaluated according to the following evaluation criteria.

[Evaluation Criteria of Curability]
A, excellent: The sample was cured at an integrated light quantity of 5 J/cm².
B, good: The sample was cured at an integrated light quantity of 7.5 J/cm².
C, fair: The sample was cured at an integrated light quantity of 15 J/cm².
D, poor: There is an uncured portion at an integrated light quantity of 15 J/cm².

[(2) Cured Product of Model Material Clear Composition]

(2-1. Method for Producing and Evaluating Cured Product)

The model material clear compositions of Examples 1 to 22 and Comparative Examples 1 to 4 were photocured to prepare cured products, and the tensile strength, color tone, and total light transmittance of each cured product were evaluated. The method for producing a cured product and the method for evaluating the cured product are shown below. The evaluation results are shown in Tables 5 to 6.

<2-1-1. Method for Evaluating Tensile Strength>

Each of the model material clear compositions of Examples 1 to 22 and Comparative Examples 1 to 4, which was molded in accordance with the multipurpose specimen type A1 shape specified in JIS K 7139-2009 "Plastics—Test specimens" using a molding apparatus in a ultraviolet ray-curing type inkjet system, was used as a sample to be measured, and a tensile strength was measured in accordance with JIS K 7162:1994 "Plastics-Determination of tensile properties-Part 2: Test conditions for molding and extrusion plastics." (molding conditions: lamination thickness per layer: 32 μm, Illuminance: 1000 mW/cm², integrated light quantity per layer: 800 mJ/cm²).

The measured tensile strength was evaluated according to the following evaluation criteria.

[Evaluation Criteria]
B, good: A value of 30 MPa or more was shown.
C, fair: A value of 20 MPa or more and less than 30 MPa was shown.
D, poor: A value of less than 20 MPa was shown.

<2-1-2. Method for Evaluating Color Tone of Cured Product>

A test piece was prepared from each of the model material clear compositions of Examples 1 to 22 and Comparative Examples 1 to 4. The Lab color difference of the sample was measured using a spectrophotometer "CM-5" (manufactured by Konica Minolta, Inc.).

The L* value, a* value, and b* value of the measured Lab color difference were evaluated according to the following evaluation criteria. The L*, a* and b* values represent the hue of the color, i.e. the color space coordinates of the color, of the sample.

[Evaluation Criteria of L]
 B, good: The value of L was 95 or more.
 C, fair: The value of L was 90 or more and less than 95.
 D, poor: The value of L was less than 90.

[Evaluation Criteria of a*]
 B, good: The value of a* was 0.2 or more and less than 2.
 D, poor: The value of a* was less than −2 or 2 or more.

[Evaluation Criteria of b*]
 A, excellent: The value of b* was −2 or more and less than 1.
 B, good: The value of b* was −5 or more and less than −2, or 1 or more and less than 2.
 C, fair: The value of b* was −10 or more and less than −5, or 2 or more and less than 4.
 D, poor: The value of b* was less than −10 or 4 or more.

<2-1-3. Evaluation of Total Light Transmittance>

A test piece was prepared from each of the model material clear compositions of Examples 1 to 22 and Comparative Examples 1 to 4. The total light transmittance of the sample was measured using a haze meter "NDH 2000" (manufactured by Nippon Denshoku Industries Co., Ltd.).

<2-1-4. Evaluation of Crystal Tone>

From the obtained L* value, a* value and b* value of the Lab color difference and the total light transmittance, the crystal tone of the model material clear composition was evaluated according to the following evaluation criteria.

[Evaluation Criteria of Crystal Tone]
 B, good: L*, a*, b* and total light transmittance were all evaluated as A or B.
 C, fair: One or more of L*, a*, b*, and total light transmittance were evaluated as C, and none of them was evaluated as D.
 D, poor: One or more of L*, a*, b*, and total light transmittance were evaluated as D.

[(3) Experimental Results]

The evaluation results of the viscosity, preservation stability, and curability of the model material clear compositions of Examples 1 to 22 and Comparative Examples 1 to 4, and those of the tensile strength, color tone, and total light transmittance of the cured products prepared by photocuring the model material clear compositions of Examples 1 to 22 and Comparative Examples 1 to 4 are shown in Tables 5 to 6. For Comparative Example 2, some evaluation was not conducted because the sample was not completely cured.

TABLE 5

|  | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|
| Viscosity | 43 | 58 | 55 | 42 | 55 | 59 | 62 | 83 | 54 | 53 | 72 | 66 | 71 |
| Preservation stability | A | A | A | A | A | A | A | A | A | A | C | C | A |
| Curability | A | A | A | A | A | A | A | A | A | C | B | A | C |
| Tensile strength | B | B | B | B | B | B | B | B | B | B | B | B | B |
| L* | B | B | B | B | B | B | B | B | B | B | B | B | B |
| a* | B | B | B | B | B | B | B | B | B | B | B | B | B |
| b* | B | B | B | B | B | B | B | B | B | B | C | B | C |
| Total light transmittance | B | B | B | B | B | B | B | B | B | B | B | B | B |
| Crystal-like | B | B | B | B | B | B | B | B | B | B | C | B | C |

TABLE 6

|  | Example 14 | Example 15 | Example 16 | Example 17 | Example 18 | Example 19 | Example 20 | Example 21 | Example 22 | Comparative Example 1 | Comparative Example 2 | Comparative Example 3 | Comparative Example 4 |
|---|---|---|---|---|---|---|---|---|---|---|---|---|---|
| Viscosity | 60 | 78 | 70 | 59 | 82 | 55 | 62 | 11 | 61 | 55 | 53 | 71 | 59 |
| Preservation stability | B | B | C | C | C | A | A | A | A | A | A | B | D |
| Curability | A | C | B | A | A | A | A | B | B | B | D | C | A |
| Tensile strength | B | B | B | B | B | B | B | D | D | B | — | B | B |
| L* | B | B | B | B | B | B | B | B | B | B | — | C | B |
| a* | B | B | B | B | B | B | B | B | B | B | — | B | B |
| b* | B | C | C | B | B | B | B | B | A | D | — | D | B |
| Total light transmittance | B | B | B | B | B | B | B | B | B | C | — | C | B |
| Crystal-like | B | C | C | B | B | B | B | B | B | D | — | D | B |

The measured total light transmittance was evaluated according to the following evaluation criteria.

[Evaluation Criteria of Total Light Transmittance]
 B, good: The total light transmittance was 85 or more.
 C, fair: The total light transmittance was 80 or more and less than 85.
 D, poor: The total light transmittance was less than 80.

With reference to Tables 5 and 6, it was confirmed that the model material clear composition according to the present invention has preservation stability and curability of a certain level or more, and at the same time, the cured product of the model material clear composition according to the present invention has tensile strength of a certain level or more, has little yellowness, and affords a highly transparent, crystal-like and clear model material.

[(4) Cured Product of Model Material Clear Composition Containing Color Material]
(4-1. Preparation of Cured Product of Model Material Clear Composition Containing Coloring Material)

Compositions of Example 23 and Comparative Example 5 were prepared by blending a color material (Quinizarin Blue) into the model material clear compositions of Example 2 and Comparative Example 1 according to the proportions shown in Table 7.

(4-2. Method for Evaluating Cured Product Containing Color Material)

The model material clear compositions of Example 23 and Comparative Example 5 were cured in the same manner as in Examples 1 to 22 and Comparative Examples 1 to 4. Next, according to the same evaluation criteria as in Examples 1 to 22 and Comparative Examples 1 to 4, the color tone, total light transmittance, and crystal tone of the cured product were evaluated. The evaluation results of the color tone and the total light transmittance of the cured products are shown in Table 7. In addition, the color tone and the total light transmittance of the cured products prepared from Example 2 and Comparative Example 1 are shown again in Table 7 as comparative references.

TABLE 7

|  | Example 23 | Example 2 | Comparative Example 5 | Comparative Example 1 |
| --- | --- | --- | --- | --- |
| Ratio of blended color material (Quinizarin Blue) to original composition/% | 0.0001 | — | 0.001 | — |
| L* | B | B | D | B |
| a* | B | B | B | B |
| b* | A | B | A | D |
| Total light transmittance | B | B | D | C |
| Crystal-like | B | B | D | D |

With reference to Table 7, it was confirmed that by blending the color material as in Example 23, the cured product of the model material clear composition according to the present invention can improve b* without impairing L*, a* and the total light transmittance and affords a further superior crystal-like clear model material. On the other hand, it was confirmed that even when a color material was blended in a composition having a large absolute value of b* as in Comparative Example 5 to improve the b*, both L* and total light transmittance were impaired and a crystal-like clear model material was not obtained.

What is claimed is:

1. A model material clear composition for use in a material-jet optical shaping process, the model material clear composition comprising an ethylenically unsaturated compound (A), a photopolymerization initiator, a polymerization inhibitor, and an antioxidant, wherein:
the ethylenically unsaturated compound (A) comprises an ethylenically unsaturated monomer (A1) having at least one selected from the group consisting of a dicyclopentenyl group and a dicyclopentanyl group,
the photopolymerization initiator is at least one photopolymerization initiator selected from the group consisting of an acylphosphine oxide-based photopolymerization initiator and an α-hydroxyacetophenone-based photopolymerization initiator,
the polymerization inhibitor is a hindered amine-based polymerization inhibitor,
the antioxidant is a phenolic antioxidant,
contents (% by mass) of the initiator, the polymerization inhibitor, and the antioxidant satisfy the following Formulae (1) and (2):

content of photopolymerization initiator≥content of polymerization inhibitor≥content of antioxidant     (1)

$1.3 \leq \sqrt{\text{content of photopolymerization initiator}} / \sqrt{[(\text{content of polymerization inhibitor} \times 10)^2 + (\text{content of antioxidant} \times 100)^2]} 760$     (2), the ethylenically unsaturated monomer (A1) is contained in an amount of 30% by mass or more based on a total mass of the ethylenically unsaturated compound (A), and
the model material clear composition provides a photocured product having an L* value of 90 or more, an a* value of −2 or more and less than 2, and a b* value of −10 or more and less than 4 in a Lab color system at a thickness of 2 mm.

2. The model material clear composition according to claim 1, wherein the ethylenically unsaturated compound (A) further comprises an ethylenically unsaturated compound (A2) having an aliphatic cyclic structure in a molecule and having a urethane group.

3. The model material clear composition according to claim 2, wherein the ethylenically unsaturated compound (A2) is contained in an amount of 10% by mass or more based on the total mass of the ethylenically unsaturated compound (A).

4. The model material clear composition according to claim 1, wherein the ethylenically unsaturated compound (A) further comprises an ethylenically unsaturated monomer (A3), the ethylenically unsaturated monomer (A1) and an ethylenically unsaturated compound (A2) having an aliphatic cyclic structure in a molecule and having a urethane group being excluded from (A3).

5. The model material clear composition according to claim 1, wherein the photopolymerization initiator is at least one photopolymerization initiator selected from the group consisting of 2,4,6-trimethylbenzoyl-diphenyl-phosphine oxide, bis(2,4,6-trimethylbenzoyl)-phenyl-phosphine oxide, and 1-hydroxy-cyclohexyl-phenyl-ketone.

6. The model material clear composition according to claim 1, wherein the content of the photopolymerization initiator is from 0.5 to 15% by mass.

7. The model material clear composition according to claim 1, wherein the content of the polymerization inhibitor is from 0.01 to 5% by mass.

8. The model material clear composition according to claim 1, wherein the content of the antioxidant is from 0.001 to 3% by mass.

9. The model material clear composition according to claim 1, further comprising a surface adjusting agent.

10. The model material clear composition according to claim 1, further comprising a color material having an absorption wavelength of 530 to 620 nm.

11. The model material clear composition according to claim 1, wherein a viscosity change rate of the model material clear composition stored for 30 days under an environment of 60° C. to the model material clear composition before storage is less than 10%.

12. A photocured product obtained by photocuring the model material clear composition according to claim 1.

13. A composition set for material-jet optical shaping, comprising the model material clear composition according to claim 1 and a model material color composition for use in a material-jet optical shaping process.

14. A composition set for material-jet optical shaping, comprising the model material clear composition according to claim 1 and a support material composition for shaping a support material by a material-jet optical shaping process.

15. The composition set for material-jet optical shaping according to claim 14, further comprising a model material color composition for use in a material-jet optical shaping process.

16. An optically shaped article obtained by photocuring the model material clear composition according to claim 1 by a material-jet optical shaping process.

17. An optically shaped article obtained by photocuring the composition set for material-jet optical shaping according to claim 13 by a material-jet optical shaping process.

18. The model material clear composition according to claim 2, wherein the ethylenically unsaturated compound (A) further comprises an ethylenically unsaturated monomer (A3), the ethylenically unsaturated monomer (A1) and the ethylenically unsaturated compound (A2) being excluded from (A3).

* * * * *